US010886617B2

(12) United States Patent
Avser et al.

(10) Patent No.: US 10,886,617 B2
(45) Date of Patent: Jan. 5, 2021

(54) ELECTRONIC DEVICES WITH PROBE-FED DIELECTRIC RESONATOR ANTENNAS

(71) Applicant: Apple Inc., Cupertino, CA (US)

(72) Inventors: Bilgehan Avser, Mountain View, CA (US); Harish Rajagopalan, San Jose, CA (US); Simone Paulotto, Redwood City, CA (US); Jennifer M. Edwards, San Francisco, CA (US); Mattia Pascolini, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 42 days.

(21) Appl. No.: 16/289,459

(22) Filed: Feb. 28, 2019

(65) Prior Publication Data

US 2020/0280131 A1   Sep. 3, 2020

(51) Int. Cl.
*H01Q 9/04*   (2006.01)
*H01Q 5/40*   (2015.01)
*H01Q 1/24*   (2006.01)
*H01Q 3/26*   (2006.01)

(52) U.S. Cl.
CPC .......... *H01Q 9/0407* (2013.01); *H01Q 1/241* (2013.01); *H01Q 3/267* (2013.01); *H01Q 3/2658* (2013.01); *H01Q 5/40* (2015.01)

(58) Field of Classification Search
None
See application file for complete search history.

(56) References Cited

U.S. PATENT DOCUMENTS

| 6,344,833 | B1* | 2/2002 | Lin .......................... H01Q 1/40 343/785 |
| 6,531,991 | B2 | 3/2003 | Adachi et al. |
| 6,768,454 | B2 | 7/2004 | Kingsley et al. |
| 6,995,715 | B2 | 2/2006 | Ying et al. |
| 7,405,697 | B2 | 7/2008 | Ying |
| 7,605,763 | B2 | 10/2009 | Finn et al. |
| 8,493,272 | B2 | 7/2013 | Ollikainen et al. |
| 9,074,070 | B2 | 7/2015 | Yung et al. |
| 9,667,290 | B2 | 5/2017 | Ouyang et al. |
| 9,685,700 | B2 | 6/2017 | Komulainen et al. |
| 9,831,562 | B2 | 11/2017 | Caratelli et al. |
| 10,027,006 | B2 | 7/2018 | Cheng et al. |

(Continued)

FOREIGN PATENT DOCUMENTS

WO   2005015689 A1   2/2005

*Primary Examiner* — Crystal L Hammond
(74) *Attorney, Agent, or Firm* — Treyz Law Group, P.C.; Michael H. Lyons; Matthew R. Williams

(57) ABSTRACT

An electronic device may be provided with a phased antenna array and a display cover layer. The phased antenna array may include a probe-fed dielectric resonator antenna. The antenna may include a dielectric resonating element mounted to a flexible printed circuit. A feed probe may be formed from a patch of conductive traces on a sidewall of the resonating element. The feed probe may excite resonant modes of the resonating element. The resonating element may convey corresponding radio-frequency signals through the display cover layer. An additional feed probe may be mounted to an orthogonal sidewall of the resonating element for covering additional polarizations. Probe-fed dielectric resonator antennas for covering different polarizations and frequencies may be interleaved across the phased antenna array.

20 Claims, 14 Drawing Sheets

(56) References Cited

U.S. PATENT DOCUMENTS

| | | |
|---|---|---|
| 10,181,632 B2 | 1/2019 | Cruickshank et al. |
| 2002/0014996 A1* | 2/2002 | Keilen .................... H01Q 1/36 343/702 |
| 2010/0103052 A1 | 4/2010 | Ying |
| 2012/0212386 A1 | 8/2012 | Massie et al. |
| 2013/0113674 A1 | 5/2013 | Ryu |
| 2014/0085163 A1 | 3/2014 | Gregg |
| 2014/0113828 A1 | 4/2014 | Gilbert et al. |
| 2015/0116159 A1 | 4/2015 | Chen et al. |
| 2016/0097833 A1* | 4/2016 | Han ................... G01R 29/0878 343/702 |
| 2016/0204509 A1 | 7/2016 | Zhai et al. |
| 2017/0201011 A1 | 7/2017 | Khripkov et al. |
| 2018/0017995 A1* | 1/2018 | Gable ................... H04B 1/3888 |
| 2018/0026341 A1 | 1/2018 | Mow et al. |
| 2018/0342801 A1 | 11/2018 | Sharawi et al. |
| 2019/0013584 A1 | 1/2019 | Ryu et al. |

\* cited by examiner

ELECTRONIC DEVICES WITH PROBE-FED DIELECTRIC RESONATOR ANTENNAS

BACKGROUND

This relates generally to electronic devices and, more particularly, to electronic devices with wireless circuitry.

Electronic devices often include wireless circuitry. For example, cellular telephones, computers, and other devices often contain antennas and wireless transceivers for supporting wireless communications.

It may be desirable to support wireless communications in millimeter wave and centimeter wave communications bands. Millimeter wave communications, which are sometimes referred to as extremely high frequency (EHF) communications, and centimeter wave communications involve communications at frequencies of about 10-300 GHz. Operation at these frequencies may support high bandwidths but may raise significant challenges. For example, radio-frequency communications in millimeter and centimeter wave communications bands can be characterized by substantial attenuation and/or distortion during signal propagation through various mediums. In addition, the presence of conductive electronic device components can make it difficult to incorporate circuitry for handling millimeter and centimeter wave communications into the electronic device.

It would therefore be desirable to be able to provide electronic devices with improved wireless circuitry such as wireless circuitry that supports millimeter and centimeter wave communications.

SUMMARY

An electronic device may be provided with a housing, a display, and wireless circuitry. The housing may include peripheral conductive housing structures that run around a periphery of the device. The display may include a display cover layer mounted to the peripheral conductive housing structures. The wireless circuitry may include a phased antenna array that conveys radio-frequency signals in one or more frequency bands between 10 GHz and 300 GHz. The phased antenna array may convey the radio-frequency signals through the display cover layer or other dielectric cover layers in the device.

The phased antenna array may include probe-fed dielectric resonator antennas. Each probe-fed dielectric resonator antenna may include a dielectric resonating element formed from a column of relatively high dielectric constant material that is embedded within a surrounding dielectric substrate. The dielectric resonating element may be mounted to a flexible printed circuit. A feed probe may be formed from a patch of conductive traces patterned on a sidewall of the dielectric resonating element. The feed probe may be coupled to a radio-frequency transmission line on the flexible printed circuit. The feed probe may excite electromagnetic resonant modes of the dielectric resonating element. When excited, the dielectric resonating element may radiate radio-frequency signals through the display cover layer. The dielectric resonating element may exhibit a relatively small lateral footprint. This may allow the dielectric resonating elements of the phased antenna array to be mounted within a relatively narrow space between a display module for the display and the peripheral conductive housing structures.

If desired, an additional feed probe may be mounted to an orthogonal sidewall of the dielectric resonating element. Each feed probe may convey radio-frequency signals with a different linear polarization. The flexible printed circuit may include ground traces. If desired, the ground traces may define a slot that overlaps the dielectric resonating element. The width of the slot, the dimensions of the feed probes, and/or transmission line stubs may be used to match the impedance of the radio-frequency transmission lines to the impedance of the dielectric resonating element.

The phased antenna array may include first and second sets of probe-fed dielectric resonator antennas. Each antenna in the first set may include a dielectric resonating element and first and second feed probes for conveying radio-frequency signals in a first frequency band with orthogonal linear polarizations. Each antenna in the second set may include a dielectric resonating element and first and second feed probes for conveying radio-frequency signals in a second frequency band with orthogonal polarizations. Because probe-fed dielectric resonator antennas occupy less lateral area than other types of antennas such as patch antennas or slot antennas, the probe-fed dielectric resonator antennas from the first and second sets may be arranged in an interleaved pattern across the phased antenna array.

DETAILED DESCRIPTION

Figure 1:
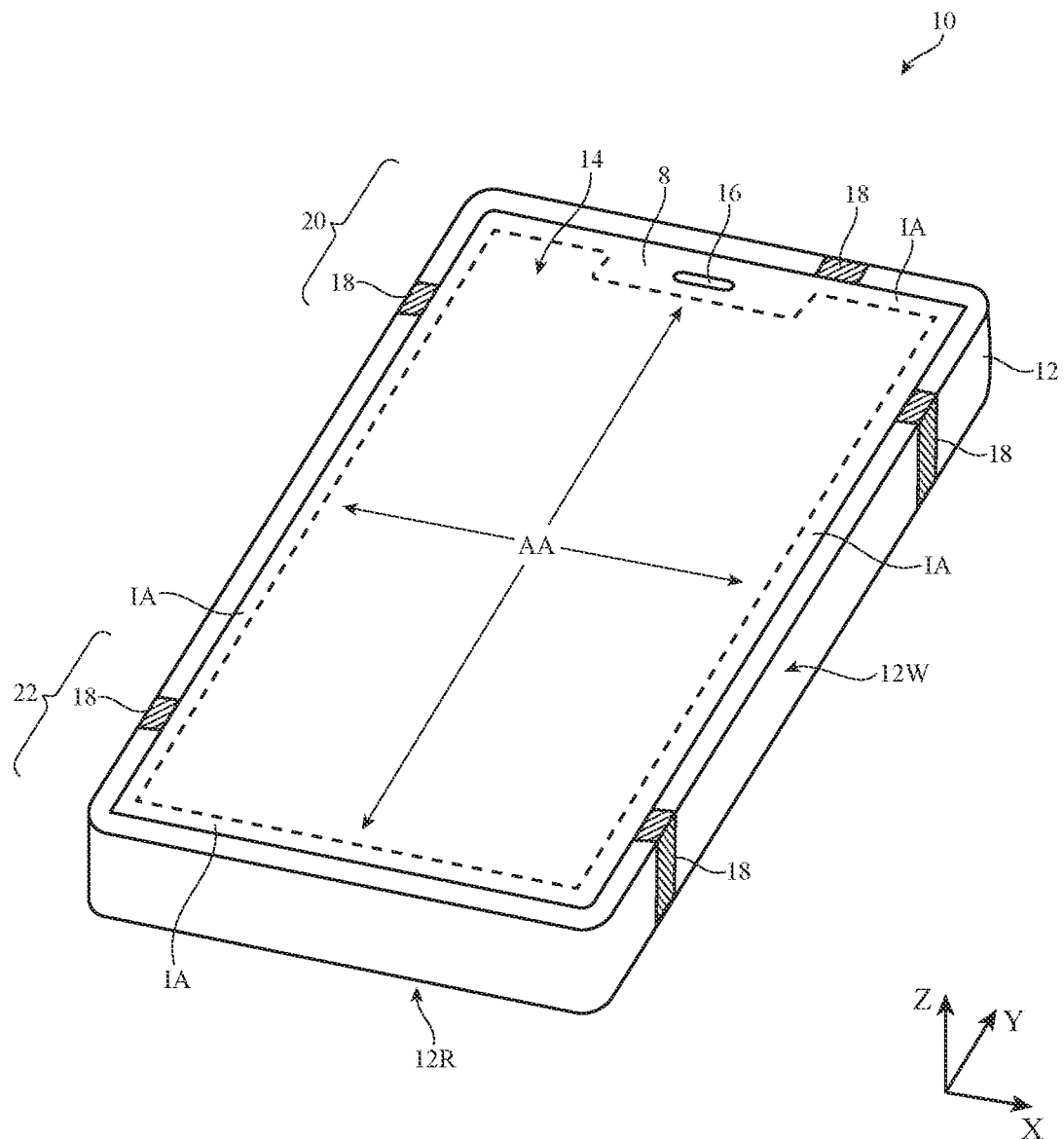
FIG. 1 is a perspective view of an illustrative electronic device in accordance with some embodiments.

An electronic device such as electronic device 10 of FIG. 1 may contain wireless circuitry. The wireless circuitry may include one or more antennas. The antennas may include phased antenna arrays that are used for performing wireless communications using millimeter and centimeter wave signals. Millimeter wave signals, which are sometimes referred to as extremely high frequency (EHF) signals, propagate at frequencies above about 30 GHz (e.g., at 60 GHz or other frequencies between about 30 GHz and 300 GHz). Centimeter wave signals propagate at frequencies between about 10 GHz and 30 GHz. If desired, device 10 may also contain antennas for handling satellite navigation system signals, cellular telephone signals, local wireless area network signals, near-field communications, light-based wireless communications, or other wireless communications.

Electronic device 10 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a handheld device such as a cellular telephone, a media player, or other small portable device. Device 10 may also be a set-top box, a desktop computer, a display into which a computer or other processing circuitry has been integrated, a display without an integrated computer, a wireless access point, a wireless base station, an electronic device incorporated into a kiosk, building, or vehicle, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a substantially planar housing wall such as rear housing wall 12R (e.g., a planar housing wall). Rear housing wall 12R may have slots that pass entirely through the rear housing wall and that therefore separate portions of housing 12 from each other. Rear housing wall 12R may include conductive portions and/or dielectric portions. If desired, rear housing wall 12R may include a planar metal layer covered by a thin layer or coating of dielectric such as glass, plastic, sapphire, or ceramic. Housing 12 may also have shallow grooves that do not pass entirely through housing 12. The slots and grooves may be filled with plastic or other dielectric. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Conductive portions of peripheral structures 12W and conductive portions of rear housing wall 12R may sometimes be referred to herein collectively as conductive structures of housing 12. Peripheral structures 12W may run around the periphery of device 10 and display 14. In configurations in which device 10 and display 14 have a rectangular shape with four edges, peripheral structures 12W may be implemented using peripheral housing structures that have a rectangular ring shape with four corresponding edges and that extend from rear housing wall 12R to the front face of device 10 (as an example). Peripheral structures 12W or part of peripheral structures 12W may serve as a bezel for display 14 (e.g., a cosmetic trim that surrounds all four sides of display 14 and/or that helps hold display 14 to device 10) if desired. Peripheral structures 12W may, if desired, form sidewall structures for device 10 (e.g., by forming a metal band with vertical sidewalls, curved sidewalls, etc.).

Peripheral structures 12W may be formed of a conductive material such as metal and may therefore sometimes be referred to as peripheral conductive housing structures, conductive housing structures, peripheral metal structures, peripheral conductive sidewalls, peripheral conductive sidewall structures, conductive housing sidewalls, peripheral conductive housing sidewalls, sidewalls, sidewall structures, or a peripheral conductive housing member (as examples). Peripheral conductive housing structures 12W may be formed from a metal such as stainless steel, aluminum, or other suitable materials. One, two, or more than two separate structures may be used in forming peripheral conductive housing structures 12W.

It is not necessary for peripheral conductive housing structures 12W to have a uniform cross-section. For example, the top portion of peripheral conductive housing structures 12W may, if desired, have an inwardly protruding ledge that helps hold display 14 in place. The bottom portion of peripheral conductive housing structures 12W may also have an enlarged lip (e.g., in the plane of the rear surface of device 10). Peripheral conductive housing structures 12W may have substantially straight vertical sidewalls, may have sidewalls that are curved, or may have other suitable shapes. In some configurations (e.g., when peripheral conductive housing structures 12W serve as a bezel for display 14), peripheral conductive housing structures 12W may run around the lip of housing 12 (i.e., peripheral conductive housing structures 12W may cover only the edge of housing 12 that surrounds display 14 and not the rest of the sidewalls of housing 12).

Rear housing wall 12R may lie in a plane that is parallel to display 14. In configurations for device 10 in which some or all of rear housing wall 12R is formed from metal, it may be desirable to form parts of peripheral conductive housing structures 12W as integral portions of the housing structures forming rear housing wall 12R. For example, rear housing wall 12R of device 10 may include a planar metal structure and portions of peripheral conductive housing structures 12W on the sides of housing 12 may be formed as flat or curved vertically extending integral metal portions of the planar metal structure (e.g., housing structures 12R and 12W may be formed from a continuous piece of metal in a unibody configuration). Housing structures such as these may, if desired, be machined from a block of metal and/or may include multiple metal pieces that are assembled together to form housing 12. Rear housing wall 12R may have one or more, two or more, or three or more portions. Peripheral conductive housing structures 12W and/or conductive portions of rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating layers that may include dielectric materials such as glass, ceramic, plastic, or other structures that form the exterior surfaces of device 10 and/or serve to hide peripheral conductive housing structures 12W and/or conductive portions of rear housing wall 12R from view of the user).

Display 14 may have an array of pixels that form an active area AA that displays images for a user of device 10. For example, active area AA may include an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies. If desired, active area AA may include touch sensors such as touch sensor capacitive electrodes, force sensors, or other sensors for gathering a user input.

Display 14 may have an inactive border region that runs along one or more of the edges of active area AA. Inactive area IA of display 14 may be free of pixels for displaying images and may overlap circuitry and other internal device structures in housing 12. To block these structures from view by a user of device 10, the underside of the display cover layer or other layers in display 14 that overlap inactive area IA may be coated with an opaque masking layer in inactive area IA. The opaque masking layer may have any suitable color. Inactive area IA may include a recessed region such as notch 8 that extends into active area AA. Active area AA may, for example, be defined by the lateral area of a display module for display 14 (e.g., a display module that includes pixel circuitry, touch sensor circuitry, etc.). The display module may have a recess or notch in upper region 20 of device 10 that is free from active display circuitry (i.e., that forms notch 8 of inactive area IA). Notch 8 may be a substantially rectangular region that is surrounded (defined) on three sides by active area AA and on a fourth side by peripheral conductive housing structures 12W.

Display 14 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10. Openings may be formed in the display cover layer. For example, an opening may be formed in the display cover layer to accommodate a button. An opening may also be formed in the display cover layer to accommodate ports such as speaker port 16 in notch 8 or a microphone port. Openings may be formed in housing 12 to form communications ports (e.g., an audio jack port, a digital data port, etc.) and/or audio ports for audio components such as a speaker and/or a microphone if desired.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a backplate) that spans the walls of housing 12 (i.e., a substantially rectangular sheet formed from one or more metal parts that is welded or otherwise connected between opposing sides of peripheral conductive structures 12W). The backplate may form an exterior rear surface of device 10 or may be covered by layers such as thin cosmetic layers, protective coatings, and/or other coatings that may include dielectric materials such as glass, ceramic, plastic, or other structures that form the exterior surfaces of device 10 and/or serve to hide the backplate from view of the user. Device 10 may also include conductive structures such as printed circuit boards, components mounted on printed circuit boards, and other internal conductive structures. These conductive structures, which may be used in forming a ground plane in device 10, may extend under active area AA of display 14, for example.

In regions 22 and 20, openings may be formed within the conductive structures of device 10 (e.g., between peripheral conductive housing structures 12W and opposing conductive ground structures such as conductive portions of rear housing wall 12R, conductive traces on a printed circuit board, conductive electrical components in display 14, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 22 and 20 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 22 and 20. If desired, the ground plane that is under active area AA of display 14 and/or other metal structures in device 10 may have portions that extend into parts of the ends of device 10 (e.g., the ground may extend towards the dielectric-filled openings in regions 22 and 20), thereby narrowing the slots in regions 22 and 20.

In general, device 10 may include any suitable number of antennas (e.g., one or more, two or more, three or more, four or more, etc.). The antennas in device 10 may be located at opposing first and second ends of an elongated device housing (e.g., ends at regions 22 and 20 of device 10 of FIG. 1), along one or more edges of a device housing, in the center of a device housing, in other suitable locations, or in one or more of these locations. The arrangement of FIG. 1 is merely illustrative.

Portions of peripheral conductive housing structures 12W may be provided with peripheral gap structures. For example, peripheral conductive housing structures 12W may be provided with one or more gaps such as gaps 18, as shown in FIG. 1. The gaps in peripheral conductive housing structures 12W may be filled with dielectric such as polymer, ceramic, glass, air, other dielectric materials, or combinations of these materials. Gaps 18 may divide peripheral conductive housing structures 12W into one or more peripheral conductive segments. The conductive segments that are formed in this way may form parts of antennas in device 10 if desired. Other dielectric openings may be formed in peripheral conductive housing structures 12W (e.g., dielectric openings other than gaps 18) and may serve as dielectric antenna windows for antennas mounted within the interior of device 10. Antennas within device 10 may be aligned with the dielectric antenna windows for conveying radio-frequency signals through peripheral conductive housing structures 12W. Antennas within device 10 may also be aligned with inactive area IA of display 14 for conveying radio-frequency signals through display 14.

In order to provide an end user of device 10 with as large of a display as possible (e.g., to maximize an area of the device used for displaying media, running applications, etc.), it may be desirable to increase the amount of area at the front face of device 10 that is covered by active area AA of display 14. Increasing the size of active area AA may reduce the size of inactive area IA within device 10. This may reduce the area behind display 14 that is available for antennas within device 10. For example, active area AA of display 14 may include conductive structures that serve to block radio-frequency signals handled by antennas mounted behind active area AA from radiating through the front face of device 10. It would therefore be desirable to be able to provide antennas that occupy a small amount of space within device 10 (e.g., to allow for as large of a display active area AA as possible) while still allowing the antennas to communicate with wireless equipment external to device 10 with satisfactory efficiency bandwidth.

In a typical scenario, device 10 may have one or more upper antennas and one or more lower antennas (as an example). An upper antenna may, for example, be formed at the upper end of device 10 in region 20. A lower antenna may, for example, be formed at the lower end of device 10 in region 22. Additional antennas may be formed along the edges of housing 12 extending between regions 20 and 22 if desired. The antennas may be used separately to cover identical communications bands, overlapping communications bands, or separate communications bands. The antennas may be used to implement an antenna diversity scheme or a multiple-input-multiple-output (MIMO) antenna scheme. Other antennas for covering any other desired frequencies may also be mounted at any desired locations within the interior of device 10. The example of FIG. 1 is merely illustrative. If desired, housing 12 may have other shapes (e.g., a square shape, cylindrical shape, spherical shape, combinations of these and/or different shapes, etc.).

Figure 2:
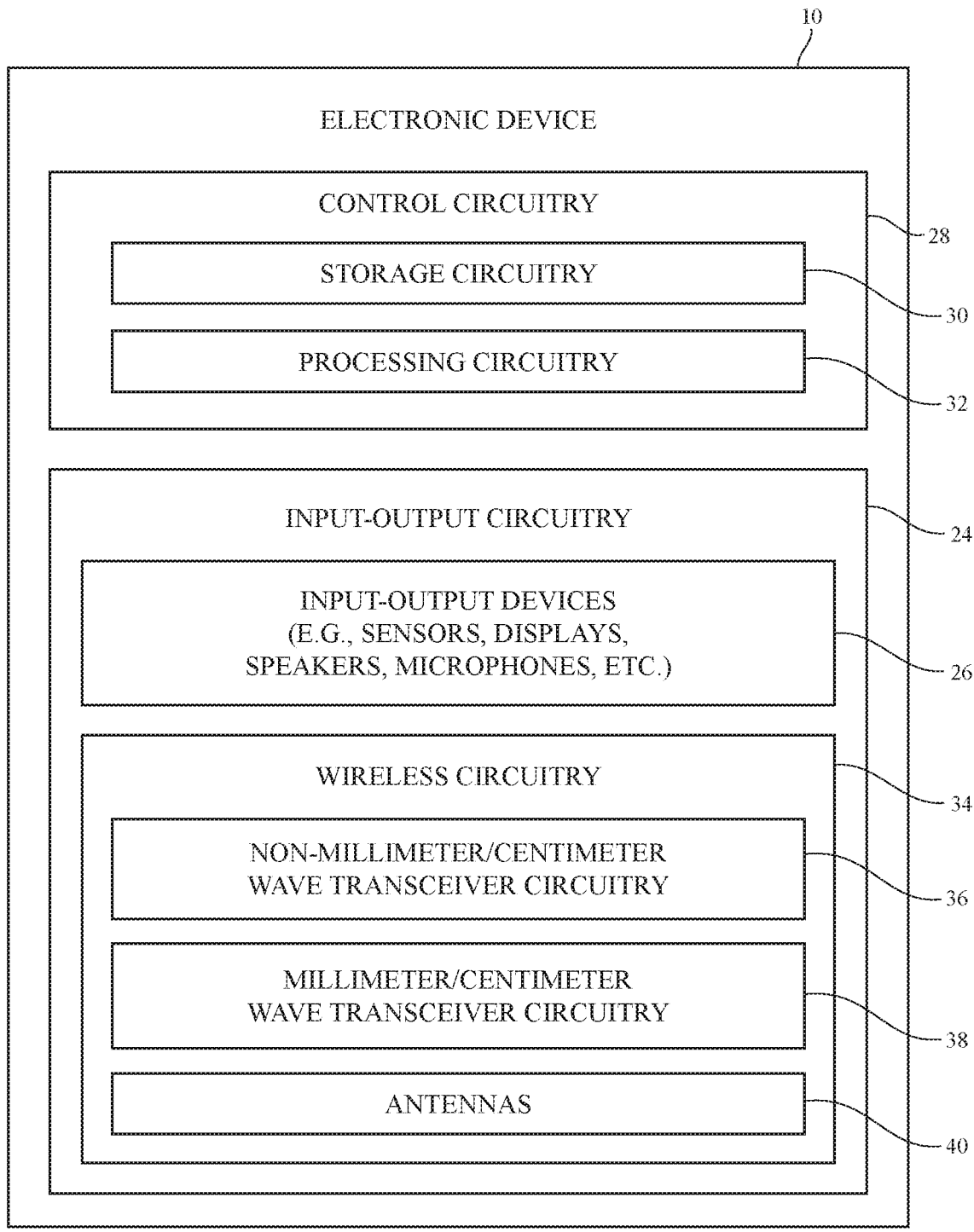
FIG. 2 is a schematic diagram of illustrative circuitry in an electronic device in accordance with some embodiments.

A schematic diagram of illustrative components that may be used in device 10 is shown in FIG. 2. As shown in FIG. 2, device 10 may include control circuitry 28. Control circuitry 28 may include storage such as storage circuitry 30. Storage circuitry 30 may include hard disk drive storage, nonvolatile memory (e.g., flash memory or other electrically-programmable-read-only memory configured to form a solid-state drive), volatile memory (e.g., static or dynamic random-access-memory), etc. Control circuitry 28 may include processing circuitry such as processing circuitry 32. Processing circuitry 32 may be used to control the operation of device 10. Processing circuitry 32 may include on one or more microprocessors, microcontrollers, digital signal processors, host processors, baseband processor integrated circuits, application specific integrated circuits, central processing units (CPUs), etc. Control circuitry 28 may be configured to perform operations in device 10 using hardware (e.g., dedicated hardware or circuitry), firmware, and/or software. Software code for performing operations in device 10 may be stored on storage circuitry 30 (e.g., storage circuitry 30 may include non-transitory (tangible) computer readable storage media that stores the software code). The software code may sometimes be referred to as program instructions, software, data, instructions, or code. Software code stored on storage circuitry 30 may be executed by processing circuitry 32.

Control circuitry 28 may be used to run software on device 10 such as internet browsing applications, voice-over-internet-protocol (VOIP) telephone call applications, email applications, media playback applications, operating system functions, etc. To support interactions with external equipment, control circuitry 28 may be used in implementing communications protocols. Communications protocols that may be implemented using control circuitry 28 include internet protocols, wireless local area network protocols (e.g., IEEE 802.11 protocols—sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output circuitry 24. Input-output circuitry 24 may include input-output devices 26. Input-output devices 26 may be used to allow data to be supplied to device 10 and to allow data to be provided from device 10 to external devices. Input-output devices 26 may include user interface devices, data port devices, sensors, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components.

Input-output circuitry 24 may include wireless circuitry such as wireless circuitry 34 for wirelessly conveying radio-frequency signals. While control circuitry 28 is shown separately from wireless circuitry 34 in the example of FIG. 2 for the sake of clarity, wireless circuitry 34 may include processing circuitry that forms a part of processing circuitry 32 and/or storage circuitry that forms a part of storage circuitry 30 of control circuitry 28 (e.g., portions of control circuitry 28 may be implemented on wireless circuitry 34). As an example, control circuitry 28 may include baseband processor circuitry or other control components that form a part of wireless circuitry 34.

Wireless circuitry 34 may include millimeter and centimeter wave transceiver circuitry such as millimeter/centimeter wave transceiver circuitry 38. Millimeter/centimeter wave transceiver circuitry 38 may support communications at frequencies between about 10 GHz and 300 GHz. For example, millimeter/centimeter wave transceiver circuitry 38 may support communications in Extremely High Frequency (EHF) or millimeter wave communications bands between about 30 GHz and 300 GHz and/or in centimeter wave communications bands between about 10 GHz and 30 GHz (sometimes referred to as Super High Frequency (SHF) bands). As examples, millimeter/centimeter wave transceiver circuitry 38 may support communications in an IEEE K communications band between about 18 GHz and 27 GHz, a $K_a$ communications band between about 26.5 GHz and 40 GHz, a $K_u$ communications band between about 12 GHz and 18 GHz, a V communications band between about 40 GHz and 75 GHz, a W communications band between about 75 GHz and 110 GHz, or any other desired frequency band between approximately 10 GHz and 300 GHz. If desired, millimeter/centimeter wave transceiver circuitry 38 may support IEEE 802.11ad communications at 60 GHz and/or $5^{th}$ generation mobile networks or $5^{th}$ generation wireless systems (5G) communications bands between 27 GHz and 90 GHz. Millimeter/centimeter wave transceiver circuitry 38 may be formed from one or more integrated circuits (e.g., multiple integrated circuits mounted on a common printed circuit in a system-in-package device, one or more integrated circuits mounted on different substrates, etc.).

If desired, millimeter/centimeter wave transceiver circuitry 38 (sometimes referred to herein simply as transceiver circuitry 38 or millimeter/centimeter wave circuitry 38) may perform spatial ranging operations using radio-frequency signals at millimeter and/or centimeter wave signals that are transmitted and received by millimeter/centimeter wave transceiver circuitry 38. The received signals may be a version of the transmitted signals that have been reflected off of external objects and back towards device 10. Control circuitry 28 may process the transmitted and received signals to detect or estimate a range between device 10 and one or more external objects in the surroundings of device 10 (e.g., objects external to device 10 such as the body of a user or other persons, other devices, animals, furniture, walls, or other objects or obstacles in the vicinity of device 10). If desired, control circuitry 28 may also process the transmitted and received signals to identify a two or three-dimensional spatial location of the external objects relative to device 10.

Spatial ranging operations performed by millimeter/centimeter wave transceiver circuitry 38 are unidirectional. Millimeter/centimeter wave transceiver circuitry 38 may perform bidirectional communications with external wireless equipment. Bidirectional communications involve both the transmission of wireless data by millimeter/centimeter wave transceiver circuitry 38 and the reception of wireless data that has been transmitted by external wireless equipment. The wireless data may, for example, include data that has been encoded into corresponding data packets such as wireless data associated with a telephone call, streaming media content, internet browsing, wireless data associated with software applications running on device 10, email messages, etc.

If desired, wireless circuitry 34 may include transceiver circuitry for handling communications at frequencies below 10 GHz such as non-millimeter/centimeter wave transceiver circuitry 36. Non-millimeter/centimeter wave transceiver circuitry 36 may include wireless local area network (WLAN) transceiver circuitry that handles 2.4 GHz and 5 GHz bands for Wi-Fi® (IEEE 802.11) communications, wireless personal area network (WPAN) transceiver circuitry that handles the 2.4 GHz Bluetooth® communications band, cellular telephone transceiver circuitry that handles cellular telephone communications bands from 700 to 960 MHz, 1710 to 2170 MHz, 2300 to 2700 MHz, and/or or any other desired cellular telephone communications bands between 600 MHz and 4000 MHz, GPS receiver circuitry that receives GPS signals at 1575 MHz or signals for handling other satellite positioning data (e.g., GLONASS signals at 1609 MHz), television receiver circuitry, AM/FM radio receiver circuitry, paging system transceiver circuitry, near field communications (NFC) circuitry, etc. Non-millimeter/centimeter wave transceiver circuitry 36 and millimeter/centimeter wave transceiver circuitry 38 may each include one or more integrated circuits, power amplifier circuitry, low-noise input amplifiers, passive radio-frequency components, switching circuitry, transmission line structures, and other circuitry for handling radio-frequency signals.

Wireless circuitry 34 may include antennas 40. Non-millimeter/centimeter wave transceiver circuitry 36 may transmit and receive radio-frequency signals below 10 GHz using one or more antennas 40. Millimeter/centimeter wave transceiver circuitry 38 may transmit and receive radio-frequency signals above 10 GHz (e.g., at millimeter wave and/or centimeter wave frequencies) using antennas 40.

In satellite navigation system links, cellular telephone links, and other long-range links, radio-frequency signals are typically used to convey data over thousands of feet or miles. In Wi-Fi® and Bluetooth® links at 2.4 and 5 GHz and other short-range wireless links, radio-frequency signals are typically used to convey data over tens or hundreds of feet. Millimeter/centimeter wave transceiver circuitry 38 may convey radio-frequency signals over short distances that travel over a line-of-sight path. To enhance signal reception for millimeter and centimeter wave communications, phased antenna arrays and beam steering techniques may be used (e.g., schemes in which antenna signal phase and/or magnitude for each antenna in an array are adjusted to perform beam steering). Antenna diversity schemes may also be used to ensure that the antennas that have become blocked or that are otherwise degraded due to the operating environment of device 10 can be switched out of use and higher-performing antennas used in their place.

Antennas 40 in wireless circuitry 34 may be formed using any suitable antenna types. For example, antennas 40 may include antennas with resonating elements that are formed from stacked patch antenna structures, loop antenna structures, patch antenna structures, inverted-F antenna structures, slot antenna structures, planar inverted-F antenna structures, monopole antenna structures, dipole antenna structures, helical antenna structures, Yagi (Yagi-Uda) antenna structures, hybrids of these designs, etc. In another suitable arrangement, antennas 40 may include antennas with dielectric resonating elements such as dielectric resonator antennas. If desired, one or more of antennas 40 may be cavity-backed antennas. Different types of antennas may be used for different bands and combinations of bands. For example, one type of antenna may be used in forming a non-millimeter/centimeter wave wireless link for non-millimeter/centimeter wave transceiver circuitry 36 and another type of antenna may be used in conveying radio-frequency signals at millimeter and/or centimeter wave frequencies for millimeter/centimeter wave transceiver circuitry 38. Antennas 40 that are used to convey radio-frequency signals at millimeter and centimeter wave frequencies may be arranged in one or more phased antenna arrays.

Figure 3:
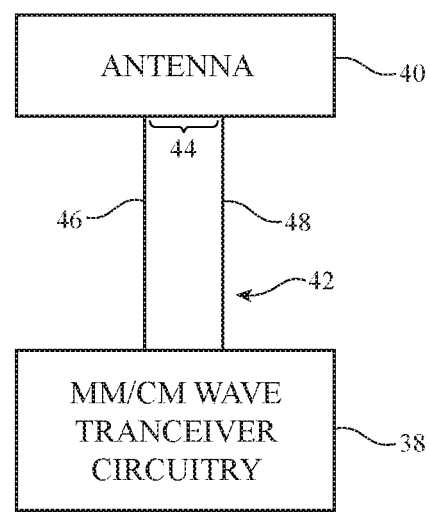
FIG. 3 is a schematic diagram of illustrative wireless circuitry in accordance with some embodiments.

A schematic diagram of an antenna 40 that may be formed in a phased antenna array for conveying radio-frequency signals at millimeter and centimeter wave frequencies is shown in FIG. 3. As shown in FIG. 3, antenna 40 may be coupled to millimeter/centimeter (MM/CM) wave transceiver circuitry 38. Millimeter/centimeter wave transceiver circuitry 38 may be coupled to antenna feed 44 of antenna 40 using a transmission line path that includes radio-frequency transmission line 42. Radio-frequency transmission line 42 may include a positive signal conductor such as signal conductor 46 and may include a ground conductor such as ground conductor 48. Ground conductor 48 may be coupled to the antenna ground for antenna 40 (e.g., over a ground antenna feed terminal of antenna feed 44 located on the antenna ground). Signal conductor 46 may be coupled to the antenna resonating element for antenna 40. For example, signal conductor 46 may be coupled to a positive antenna feed terminal of antenna feed 44 located on the antenna resonating element. In another suitable arrangement, antenna 40 may be a probe-fed antenna that is fed using a feed probe. In this arrangement, antenna feed 44 may be implemented as a feed probe. Signal conductor 46 may be coupled to the feed probe. Radio-frequency transmission line 42 may convey radio-frequency signals to and from the feed probe. When radio-frequency signals are being conveyed over the feed probe, the feed probe may excite the resonating element for the antenna (e.g., a dielectric antenna resonating element for antenna 40). The resonating element may radiate the radio-frequency signals in response to excitation by the feed probe.

Radio-frequency transmission line 42 may include a stripline transmission line (sometimes referred to herein simply as a stripline), a coaxial cable, a coaxial probe realized by metalized vias, a microstrip transmission line, an edge-coupled microstrip transmission line, an edge-coupled stripline transmission lines, a waveguide structure, combinations of these, etc. Multiple types of transmission lines may be used to form the transmission line path that couples millimeter/centimeter wave transceiver circuitry 38 to antenna feed 44. Filter circuitry, switching circuitry, impedance matching circuitry, phase shifter circuitry, amplifier circuitry, and/or other circuitry may be interposed on radio-frequency transmission line 42, if desired.

Radio-frequency transmission lines in device 10 may be integrated into ceramic substrates, rigid printed circuit boards, and/or flexible printed circuits. In one suitable arrangement, radio-frequency transmission lines in device 10 may be integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

Figure 4:
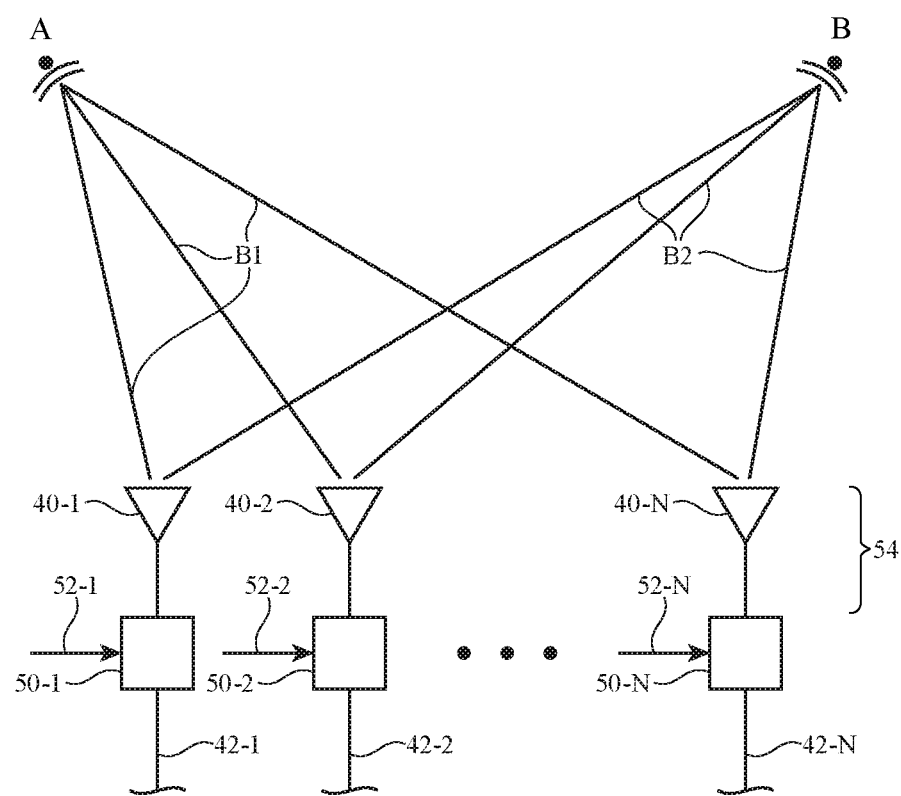
FIG. 4 is a diagram of an illustrative phased antenna array that may be adjusted using control circuitry to direct a beam of signals in accordance with some embodiments.

FIG. 4 shows how antennas 40 for handling radio-frequency signals at millimeter and centimeter wave frequencies may be formed in a phased antenna array. As shown in FIG. 4, phased antenna array 54 (sometimes referred to herein as array 54, antenna array 54, or array 54 of antennas 40) may be coupled to radio-frequency transmission lines 42. For example, a first antenna 40-1 in phased antenna array 54 may be coupled to a first radio-frequency transmission line 42-1, a second antenna 40-2 in phased antenna array 54 may be coupled to a second radio-frequency transmission line 42-2, an Nth antenna 40-N in phased antenna array 54 may be coupled to an Nth radio-frequency transmission line 42-N, etc. While antennas 40 are described herein as forming a phased antenna array, the antennas 40 in phased antenna array 54 may sometimes also be referred to as collectively forming a single phased array antenna.

Antennas 40 in phased antenna array 54 may be arranged in any desired number of rows and columns or in any other desired pattern (e.g., the antennas need not be arranged in a grid pattern having rows and columns). During signal transmission operations, radio-frequency transmission lines 42 may be used to supply signals (e.g., radio-frequency signals such as millimeter wave and/or centimeter wave signals) from millimeter/centimeter wave transceiver circuitry 38 (FIG. 3) to phased antenna array 54 for wireless transmission. During signal reception operations, radio-frequency transmission lines 42 may be used to convey signals received at phased antenna array 54 (e.g., from external wireless equipment or transmitted signals that have been reflected off of external objects) to millimeter/centimeter wave transceiver circuitry 38 (FIG. 3).

The use of multiple antennas 40 in phased antenna array 54 allows beam steering arrangements to be implemented by controlling the relative phases and magnitudes (amplitudes) of the radio-frequency signals conveyed by the antennas. In the example of FIG. 4, antennas 40 each have a corresponding radio-frequency phase and magnitude controller 50 (e.g., a first phase and magnitude controller 50-1 interposed on radio-frequency transmission line 42-1 may control phase and magnitude for radio-frequency signals handled by antenna 40-1, a second phase and magnitude controller 50-2 interposed on radio-frequency transmission line 42-2 may control phase and magnitude for radio-frequency signals handled by antenna 40-2, an Nth phase and magnitude controller 50-N interposed on radio-frequency transmission line 42-N may control phase and magnitude for radio-frequency signals handled by antenna 40-N, etc.).

Phase and magnitude controllers 50 may each include circuitry for adjusting the phase of the radio-frequency signals on radio-frequency transmission lines 42 (e.g., phase shifter circuits) and/or circuitry for adjusting the magnitude of the radio-frequency signals on radio-frequency transmission lines 42 (e.g., power amplifier and/or low noise amplifier circuits). Phase and magnitude controllers 50 may sometimes be referred to collectively herein as beam steering circuitry (e.g., beam steering circuitry that steers the beam of radio-frequency signals transmitted and/or received by phased antenna array 54).

Phase and magnitude controllers 50 may adjust the relative phases and/or magnitudes of the transmitted signals that are provided to each of the antennas in phased antenna array 54 and may adjust the relative phases and/or magnitudes of the received signals that are received by phased antenna array 54. Phase and magnitude controllers 50 may, if desired, include phase detection circuitry for detecting the phases of the received signals that are received by phased antenna array 54. The term "beam" or "signal beam" may be used herein to collectively refer to wireless signals that are transmitted and received by phased antenna array 54 in a particular direction. The signal beam may exhibit a peak gain that is oriented in a particular pointing direction at a corresponding pointing angle (e.g., based on constructive and destructive interference from the combination of signals from each antenna in the phased antenna array). The term "transmit beam" may sometimes be used herein to refer to radio-frequency signals that are transmitted in a particular direction whereas the term "receive beam" may sometimes be used herein to refer to radio-frequency signals that are received from a particular direction.

If, for example, phase and magnitude controllers 50 are adjusted to produce a first set of phases and/or magnitudes for transmitted radio-frequency signals, the transmitted signals will form a transmit beam as shown by beam B1 of FIG. 4 that is oriented in the direction of point A. If, however, phase and magnitude controllers 50 are adjusted to produce a second set of phases and/or magnitudes for the transmitted signals, the transmitted signals will form a transmit beam as shown by beam B2 that is oriented in the direction of point B. Similarly, if phase and magnitude controllers 50 are adjusted to produce the first set of phases and/or magnitudes, radio-frequency signals (e.g., radio-frequency signals in a receive beam) may be received from the direction of point A, as shown by beam B1. If phase and magnitude controllers 50 are adjusted to produce the second set of phases and/or magnitudes, radio-frequency signals may be received from the direction of point B, as shown by beam B2.

Each phase and magnitude controller 50 may be controlled to produce a desired phase and/or magnitude based on a corresponding control signal 52 received from control circuitry 28 of FIG. 2 (e.g., the phase and/or magnitude provided by phase and magnitude controller 50-1 may be controlled using control signal 52-1, the phase and/or magnitude provided by phase and magnitude controller 50-2 may be controlled using control signal 52-2, etc.). If desired, the control circuitry may actively adjust control signals 52 in real time to steer the transmit or receive beam in different desired directions over time. Phase and magnitude controllers 50 may provide information identifying the phase of received signals to control circuitry 28 if desired.

When performing wireless communications using radio-frequency signals at millimeter and centimeter wave frequencies, the radio-frequency signals are conveyed over a line of sight path between phased antenna array 54 and external communications equipment. If the external object is located at point A of FIG. 4, phase and magnitude controllers 50 may be adjusted to steer the signal beam towards point A (e.g., to steer the pointing direction of the signal beam towards point A). Phased antenna array 54 may transmit and receive radio-frequency signals in the direction of point A. Similarly, if the external communications equipment is located at point B, phase and magnitude controllers 50 may be adjusted to steer the signal beam towards point B (e.g., to steer the pointing direction of the signal beam towards point B). Phased antenna array 54 may transmit and receive radio-frequency signals in the direction of point B. In the example of FIG. 4, beam steering is shown as being performed over a single degree of freedom for the sake of simplicity (e.g., towards the left and right on the page of FIG. 4). However, in practice, the beam may be steered over two or more degrees of freedom (e.g., in three dimensions, into and out of the page and to the left and right on the page of FIG. 4). Phased antenna array 54 may have a corresponding field of view over which beam steering can be performed (e.g., in a hemisphere or a segment of a hemisphere over the phased antenna array). If desired, device 10 may include multiple phased antenna arrays that each face a different direction to provide coverage from multiple sides of the device.

Figure 5:
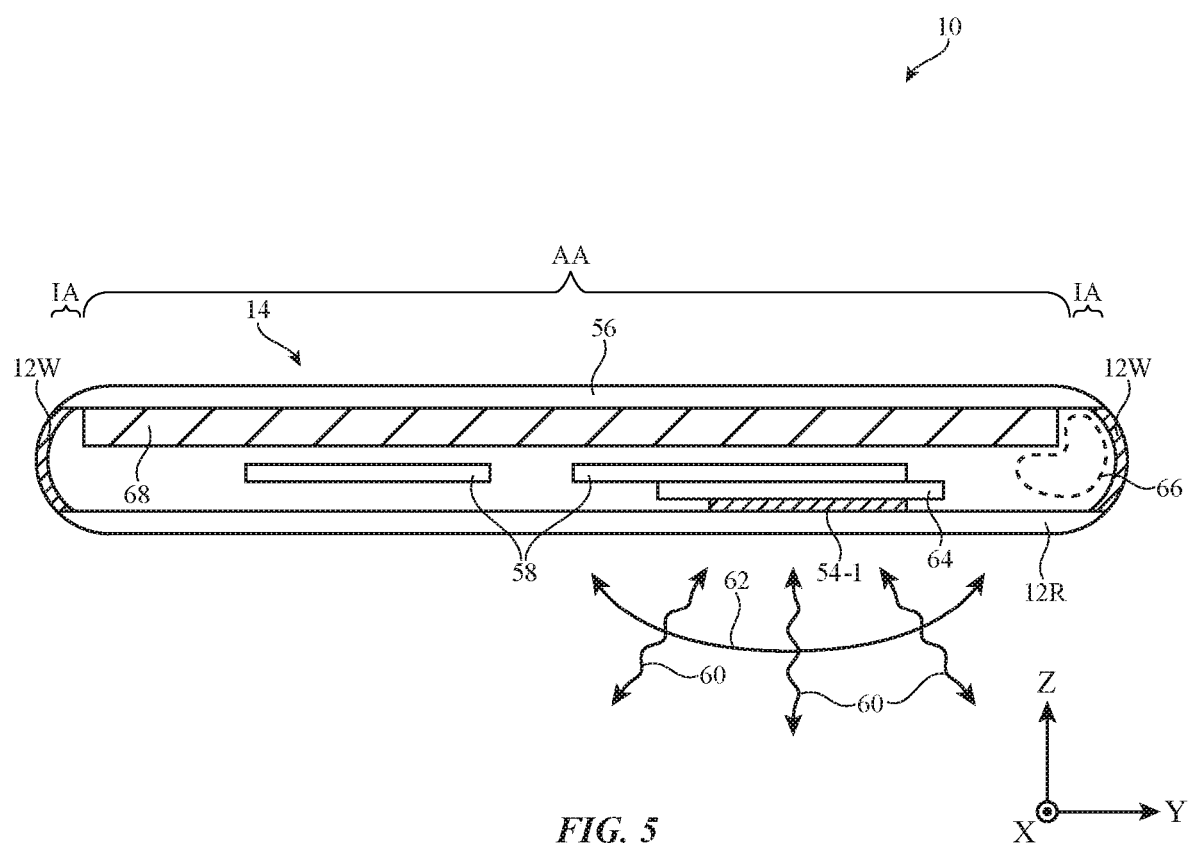
FIG. 5 is a cross-sectional side view of an illustrative electronic device having phased antenna arrays for radiating through different sides of the device in accordance with some embodiments.

FIG. 5 is a cross-sectional side view of device 10 in an example where device 10 has multiple phased antenna arrays. As shown in FIG. 5, peripheral conductive housing structures 12W may extend around the (lateral) periphery of device 10 and may extend from rear housing wall 12R to display 14. Display 14 may have a display module such as display module 68 (sometimes referred to as a display panel). Display module 68 may include pixel circuitry, touch sensor circuitry, force sensor circuitry, and/or any other desired circuitry for forming active area AA of display 14. Display 14 may include a dielectric cover layer such as display cover layer 56 that overlaps display module 68. Display module 68 may emit image light and may receive sensor input through display cover layer 56. Display cover layer 56 and display 14 may be mounted to peripheral conductive housing structures 12W. The lateral area of display 14 that does not overlap display module 68 may form inactive area IA of display 14.

Device 10 may include multiple phased antenna arrays 54 such as a rear-facing phased antenna array 54-1. As shown in FIG. 5, phased antenna array 54-1 may transmit and receive radio-frequency signals 60 at millimeter and centimeter wave frequencies through rear housing wall 12R. In scenarios where rear housing wall 12R includes metal portions, radio-frequency signals 60 may be conveyed through an aperture or opening in the metal portions of rear housing wall 12R or may be conveyed through other dielectric portions of rear housing wall 12R. The aperture may be overlapped by a dielectric cover layer or dielectric coating that extends across the lateral area of rear housing wall 12R (e.g., between peripheral conductive housing structures 12W). Phased antenna array 54-1 may perform beam steering for radio-frequency signals 60 across the hemisphere below device 10, as shown by arrow 62.

Phased antenna array 54-1 may be mounted to a substrate such as substrate 64. Substrate 64 may be an integrated circuit chip, a flexible printed circuit, a rigid printed circuit board, or other substrate. Substrate 64 may sometimes be referred to herein as antenna module 64. If desired, transceiver circuitry (e.g., millimeter/centimeter wave transceiver circuitry 38 of FIG. 2) may be mounted to antenna module 64. Phased antenna array 54-1 may be adhered to rear housing wall 12R using adhesive, may be pressed against (e.g., in contact with) rear housing wall 12R, or may be spaced apart from rear housing wall 12R.

The field of view of phased antenna array 54-1 is limited to the hemisphere under the rear face of device 10. Display module 68 and other components 58 (e.g., portions of input-output circuitry 24 or control circuitry 28 of FIG. 2, a battery for device 10, etc.) in device 10 include conductive structures. If care is not taken, these conductive structures may block radio-frequency signals from being conveyed by a phased antenna array within device 10 across the hemisphere over the front face of device 10. While an additional phased antenna array for covering the hemisphere over the front face of device 10 may be mounted against display cover layer 56 within inactive area IA, there may be insufficient space between the lateral periphery of display module 68 and peripheral conductive housing structures 12W to form all of the circuitry and radio-frequency transmission lines necessary to fully support the phased antenna array. In order to mitigate these issues and provide coverage through the front face of device 10, a front-facing phased antenna array may be mounted within peripheral region 66 of device 10. The antennas in the front-facing phased antenna array may include dielectric resonator antennas. Dielectric resonator antennas may occupy less area in the X-Y plane of FIG. 5 than other types of antennas such as patch antennas and slot antennas. Implementing the antennas as dielectric resonator antennas may allow the radiating elements of the front-facing phased antenna array to fit within inactive area IA between display module 68 and peripheral conductive housing structures 12W. At the same time, the radio-frequency transmission lines and other components for the phased antenna array may be located behind (under) display module 68.

Figure 6:
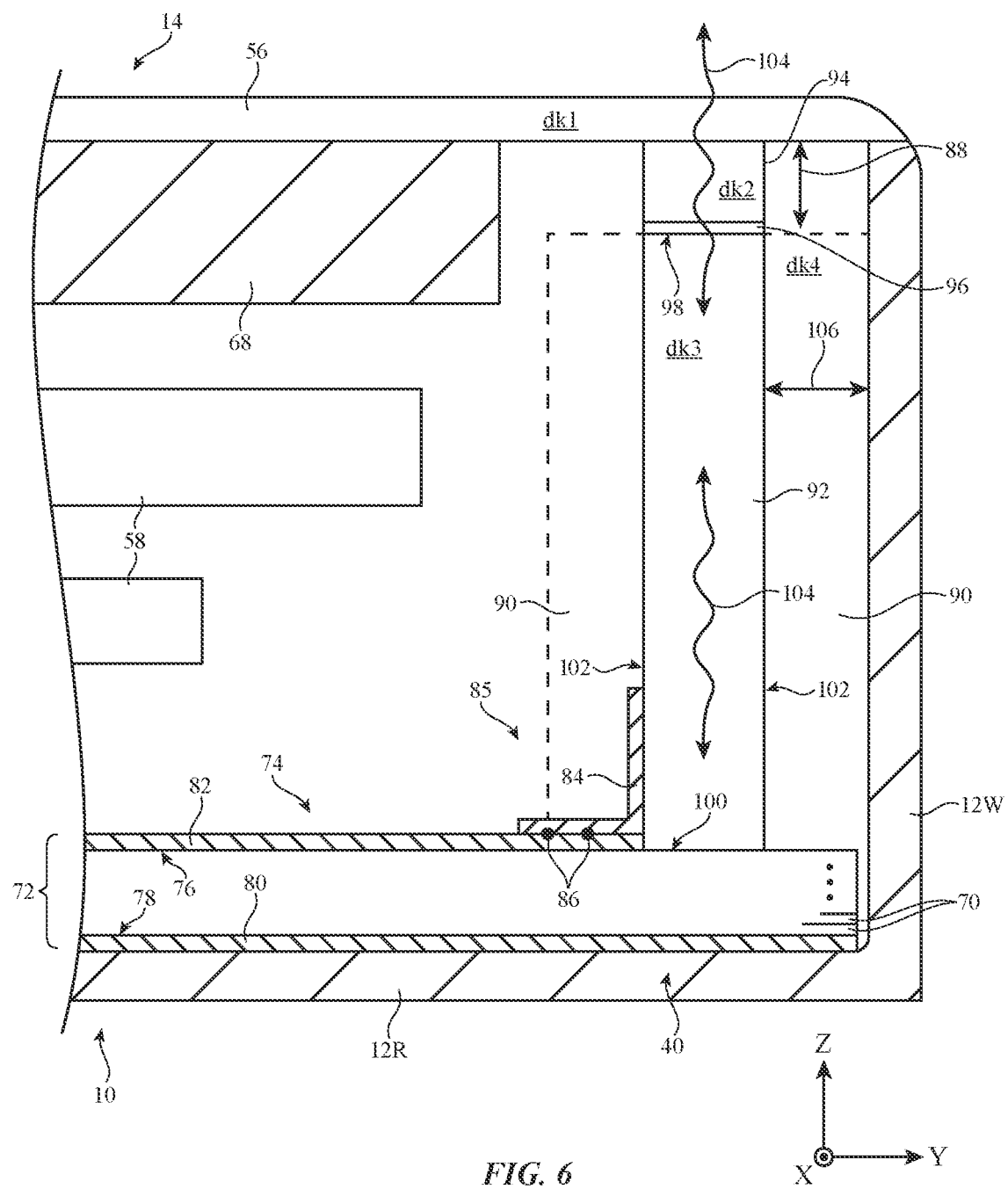
FIG. 6 is a cross-sectional side view of an illustrative probe-fed dielectric resonator antenna that may be mounted within an electronic device in accordance with some embodiments.

FIG. 6 is a cross-sectional side view of an illustrative dielectric resonator antenna in a front-facing phased antenna array for device 10. As shown in FIG. 6, device 10 may include a front-facing phased antenna array having a given antenna 40 (e.g., mounted within peripheral region 66 of FIG. 5). Antenna 40 of FIG. 6 may be a dielectric resonator antenna. In this example, antenna 40 may include a dielectric resonating element 92 mounted to an underlying substrate such as flexible printed circuit 72. This example is merely illustrative and, if desired, flexible printed circuit 72 may be replaced with a rigid printed circuit board, a plastic substrate, or any other desired substrate.

Flexible printed circuit 72 has a lateral area (e.g., in the X-Y plane of FIG. 6) that extends along rear housing wall 12R. Flexible printed circuit 72 may be adhered to rear housing wall 12R using adhesive, may be pressed against (e.g., placed in contact with) rear housing wall 12R, or may be separated from rear housing wall 12R. Flexible printed circuit 72 may have a first end at antenna 40 and an opposing second end coupled to the millimeter/centimeter wave transceiver circuitry in device 10 (e.g., millimeter/centimeter wave transceiver circuitry 38 of FIG. 2). In one suitable arrangement, the second end of flexible printed circuit 72 may be coupled to antenna module 64 of FIG. 5.

As shown in FIG. 6, flexible printed circuit 72 may include stacked dielectric layers 70. Dielectric layers 70 may include polyimide, ceramic, liquid crystal polymer, plastic, and/or any other desired dielectric materials. Conductive traces such as conductive traces 82 may be patterned on a top surface 76 of flexible printed circuit 72. Conductive traces such as conductive traces 80 may be patterned on an opposing bottom surface 78 of flexible printed circuit 72. Conductive traces 80 may be held at a ground potential and may therefore sometimes be referred to herein as ground traces 80. Ground traces 80 may be shorted to additional ground traces within flexible printed circuit 72 and/or on top surface 76 of flexible printed circuity 72 using conducive vias that extend through flexible printed circuit 72 (not shown in FIG. 6 for the sake of clarity). Ground traces 80 may form part of the antenna ground for antenna 40. Ground traces 80 may be coupled to a system ground in device 10 (e.g., using solder, welds, conductive adhesive, conductive tape, conductive brackets, conductive pins, conductive screws, conductive clips, combinations of these, etc.). For example, ground traces 80 may be coupled to peripheral conductive housing structures 12W, conductive portions of rear housing wall 12R, or other grounded structures in device 10. The example of FIG. 6 in which conductive traces 82 are formed on top surface 76 and ground traces 80 are formed on bottom surface 78 of flexible printed circuit 72 is merely illustrative. If desired, one or more dielectric layers 70 may be layered over conductive traces 82 and/or one or more dielectric layers 70 may be layered under ground traces 80.

Antenna 40 may be fed using a radio-frequency transmission line that is formed on and/or embedded within flexible printed circuit 72 such as radio-frequency transmission line 74. Radio-frequency transmission line 74 (e.g., a given radio-frequency transmission line 42 of FIG. 3) may include ground traces 80 and conductive traces 82. The portion of ground traces 80 overlapping conductive traces 82 may form the ground conductor for radio-frequency transmission line 74 (e.g., ground conductor 48 of FIG. 3). Conductive traces 82 may form the signal conductor for radio-frequency transmission line 74 (e.g., signal conductor 46 of FIG. 3) and may therefore sometimes be referred to herein as signal traces 82. Radio-frequency transmission line 74 may convey radio-frequency signals between antenna 40 and the millimeter/centimeter wave transceiver circuitry. The example of FIG. 6 in which antenna 40 is fed using signal traces 82 and ground traces 80 is merely illustrative. In general, antenna 40 may be fed using any desired transmission line structures in and/or on flexible printed circuit 72.

Dielectric resonating element 92 of antenna 40 may be formed from a column (pillar) of dielectric material mounted to top surface 76 of flexible printed circuit 72. If desired, dielectric resonating element 92 may be embedded within (e.g., laterally surrounded by) a dielectric substrate mounted to top surface 76 of flexible printed circuit 72 such as dielectric substrate 90. Dielectric substrate 90 and dielectric resonating element 92 extend from a bottom surface 100 at flexible printed circuit 72 to an opposing top surface 98 at display 14.

The radiating frequency of antenna 40 may be selected by adjusting the dimensions of dielectric resonating element 92 (e.g., in the direction of the X, Y, and/or Z axes of FIG. 6). Dielectric resonating element 92 may be formed from a column of dielectric material having dielectric constant $d_{k3}$. Dielectric constant di may be relatively high (e.g., greater than 10.0, greater than 12.0, greater than 15.0, greater than 20.0, between 15.0 and 40.0, between 10.0 and 50.0, between 18.0 and 30.0, between 12.0 and 45.0, etc.). In one suitable arrangement, dielectric resonating element 92 may be formed from zirconia or a ceramic material. Other dielectric materials may be used to form dielectric resonating element 92 if desired.

Dielectric substrate 90 may be formed from a material having dielectric constant $d_{k4}$. Dielectric constant $d_{k4}$ may be less than dielectric constant di of dielectric resonating element 92 (e.g., less than 18.0, less than 15.0, less than 10.0, between 3.0 and 4.0, less than 5.0, between 2.0 and 5.0, etc.). Dielectric constant $d_{k4}$ may be greater than dielectric constant $d_{k3}$ by at least 10.0, 5.0, 15.0, 12.0, 6.0, etc. In one suitable arrangement, dielectric substrate 90 may be formed from molded plastic. Other dielectric materials may be used to form dielectric substrate 90 or dielectric substrate 90 may be omitted if desired. The difference in dielectric constant between dielectric resonating element 92 and dielectric substrate 90 may establish a radio-frequency boundary condition between dielectric resonating element 92 and dielectric substrate 90 from bottom surface 100 to top surface 98. This may configure dielectric resonating element 92 to serve as a waveguide for propagating radio-frequency signals at millimeter and centimeter wave frequencies.

Dielectric substrate 90 may have a width (thickness) 106 on each side of dielectric resonating element 92. Width 106 may be selected to isolate dielectric resonating element 92 from peripheral conductive housing structures 12W and to minimize signal reflections in dielectric substrate 90. Width 106 may be, for example, at least one-tenth of the effective wavelength of the radio-frequency signals in a dielectric material of dielectric constant $d_{k4}$. Width 106 may be 0.4-0.5 mm, 0.3-0.5 mm, 0.2-0.6 mm, greater than 0.1 mm, greater than 0.3 mm, 0.2-2.0 mm, 0.3-1.0 mm, or greater than between 0.4 and 0.5 mm, as examples.

Dielectric resonating element 92 may radiate radio-frequency signals 104 when excited by the signal conductor for radio-frequency transmission line 74. In some scenarios, a slot is formed in ground traces on top surface 76 of flexible printed circuit, the slot is indirectly fed by a signal conductor embedded within flexible printed circuit 72, and the slot excites dielectric resonating element 92 to radiate radio-frequency signals 104. However, in these scenarios, the radiating characteristics of the antenna may be affected by how the dielectric resonating element is mounted to flexible printed circuit 72. For example, air gaps or layers of adhesive used to mount the dielectric resonating element to the flexible printed circuit can be difficult to control and can undesirably affect the radiating characteristics of the antenna. In order to mitigate the issues associated with exciting dielectric resonating element 92 using an underlying slot, antenna 40 may be fed using a radio-frequency feed probe such as feed probe 85. Feed probe 85 may form part of the antenna feed for antenna 40 (e.g., antenna feed 44 of FIG. 3).

As shown in FIG. 6, feed probe 85 may be formed from conductive traces 84. Conductive traces 84 may include a first portion patterned onto a given sidewall 102 of dielectric resonating element 92 (e.g., a conductive patch on sidewall 102 formed using a sputtering process or other conductive deposition techniques). Conductive traces 84 may include a second portion coupled to signal traces 82 using conductive interconnect structures 86. Conductive interconnect structures 86 may include solder, welds, conductive adhesive, conductive tape, conductive foam, conductive springs, conductive brackets, and/or any other desired conductive interconnect structures. Feed probe 85 may be formed from any desired conductive structures (e.g., conductive traces, conductive foil, sheet metal, and/or other conductive structures).

Signal traces 82 may convey radio-frequency signals to and from feed probe 85. Feed probe 85 may electromagnetically couple the radio-frequency signals on signal traces 82 into dielectric resonating element 92. This may serve to excite one or more electromagnetic modes (e.g., radio-frequency cavity or waveguide modes) of dielectric resonating element 92. When excited by feed probe 85, the electromagnetic modes of dielectric resonating element 92 may configure the dielectric resonating element to serve as a waveguide that propagates the wavefronts of radio-frequency signals 104 along the length of dielectric resonating element 92 (e.g., in the direction of the Z-axis of FIG. 6), through top surface 98, and through display 14.

For example, during signal transmission, radio-frequency transmission line 74 may convey radio-frequency signals from the millimeter/centimeter wave transceiver circuitry to antenna 40. Feed probe 85 may couple the radio-frequency signals on signal traces 82 into dielectric resonating element 92. This may serve to excite one or more electromagnetic modes of dielectric resonating element 92, resulting in the propagation of radio-frequency signals 104 up the length of dielectric resonating element 92 and to the exterior of device 10 through display cover layer 56. Similarly, during signal reception, radio-frequency signals 104 may be received through display cover layer 56. The received radio-frequency signals may excite the electromagnetic modes of dielectric resonating element 92, resulting in the propagation of the radio-frequency signals down the length of dielectric resonating element 92. Feed probe 85 may couple the received radio-frequency signals onto radio-frequency transmission line 74, which conveys the radio-frequency signals to the millimeter/centimeter wave transceiver circuitry. The relatively large difference in dielectric constant between dielectric resonating element 92 and dielectric substrate 90 may allow dielectric resonating element 92 to radiate radio-frequency signals 104 with a relatively high antenna efficiency (e.g., by establishing a strong boundary between dielectric resonating element 92 and dielectric substrate 90 for the radio-frequency signals). The relatively high dielectric constant of dielectric resonating element 92 may also allow the dielectric resonating element 92 to occupy a relatively small volume compared to scenarios where materials with a lower dielectric constant are used.

The dimensions of feed probe 85 (e.g., in the direction of the X-axis and Z-axis of FIG. 6) may be selected to help match the impedance of radio-frequency transmission line 74 to the impedance of dielectric resonating element 92. Feed probe 85 may be located on a particular sidewall 102 of dielectric resonating element 92 to provide antenna 40 with a desired linear polarization (e.g., a vertical or horizontal polarization). If desired, multiple feed probes 85 may be formed on multiple sidewalls 102 of dielectric resonating element 92 to configure antenna 40 to cover multiple orthogonal linear polarizations at once. The phase of each feed probe may be independently adjusted over time to provide the antenna with other polarizations such as an elliptical or circular polarization if desired. Feed probe 85 may sometimes be referred to herein as feed conductor 85, feed patch 85, or probe feed 85. Dielectric resonating element 92 may sometimes be referred to herein as a dielectric radiating element, dielectric radiator, dielectric resonator, dielectric antenna resonating element, dielectric column, dielectric pillar, radiating element, or resonating element. When fed by one or more feed probes such as feed probe 85, dielectric resonator antennas such as antenna 40 of FIG. 6 may sometimes be referred to herein as probe-fed dielectric resonator antennas.

Display cover layer 56 may be formed from a dielectric material having dielectric constant $d_{k1}$ that is less than dielectric constant $d_{k3}$. For example, dielectric constant may be between about 3.0 and 10.0 (e.g., between 4.0 and 9.0, between 5.0 and 8.0, between 5.5 and 7.0, between 5.0 and 7.0, etc.). In one suitable arrangement, display cover layer 56 may be formed from glass, plastic, or sapphire. If care is not taken, the relatively large difference in dielectric constant between display cover layer 56 and dielectric resonating element 92 may cause undesirable signal reflections at the boundary between the display cover layer and the dielectric resonating element. These reflections may result in destructive interference between the transmitted and reflected signals and in stray signal loss that undesirably limits the antenna efficiency of antenna 40.

In order to mitigate effects, antenna 40 may be provided with an impedance matching layer such as dielectric matching layer 94. Dielectric matching layer 94 may be mounted to top surface 98 of dielectric resonating element 92 between dielectric resonating element 92 and display cover layer 56. If desired, dielectric matching layer 94 may be adhered to dielectric resonating element 92 using a layer of adhesive 96. Adhesive may also or alternatively be used to adhere dielectric matching layer 94 to display cover layer 56 if desired. Adhesive 96 may be relatively thin so as not to significantly affect the propagation of radio-frequency signals 104.

Dielectric matching layer 94 may be formed from a dielectric material having dielectric constant $d_{k2}$. Dielectric constant $d_{k2}$ may be greater than dielectric constant $d_{k1}$ and less than dielectric constant $d_{k3}$. As an example, dielectric constant $d_{k2}$ may be equal to $\mathrm{SQRT}(d_{k1}*d_{k3})$, where $\mathrm{SQRT}(\ )$ is the square root operator and "*" is the multiplication operator. The presence of dielectric matching layer 94 may allow radio-frequency signals to propagate without facing a sharp boundary between the material of dielectric constant $d_{k1}$ and the material of dielectric constant $d_{k3}$, thereby helping to reduce signal reflections.

Dielectric matching layer 94 may be provided with thickness 88. Thickness 88 may be selected to be approximately equal to (e.g., within 15% of) one-quarter of the effective wavelength of radio-frequency signals 104 in dielectric matching layer 94. The effective wavelength is given by dividing the free space wavelength of radio-frequency signals 104 (e.g., a centimeter or millimeter wavelength corresponding to a frequency between 10 GHz and 300 GHz) by a constant factor (e.g., the square root of $d_{k3}$). When provided with thickness 88, dielectric matching layer 94 may form a quarter wave impedance transformer that mitigates any destructive interference associated with the reflection of radio-frequency signals 104 at the boundaries between display cover layer 56, dielectric matching layer 94, and dielectric resonating element 92.

When configured in this way, antenna 40 may radiate radio-frequency signals 104 through the front face of device 10 despite being coupled to the millimeter/centimeter wave transceiver circuitry over a flexible printed circuit located at the rear of device 10. The relatively narrow width of dielectric resonating element 92 may allow antenna 40 to fit in the volume between display module 68, other components 58, and peripheral conductive housing structures 12W. Antenna 40 of FIG. 6 may be formed in a front-facing phased antenna array that conveys radio-frequency signals across at least a portion of the hemisphere above the front face of device 10.

Figure 7:
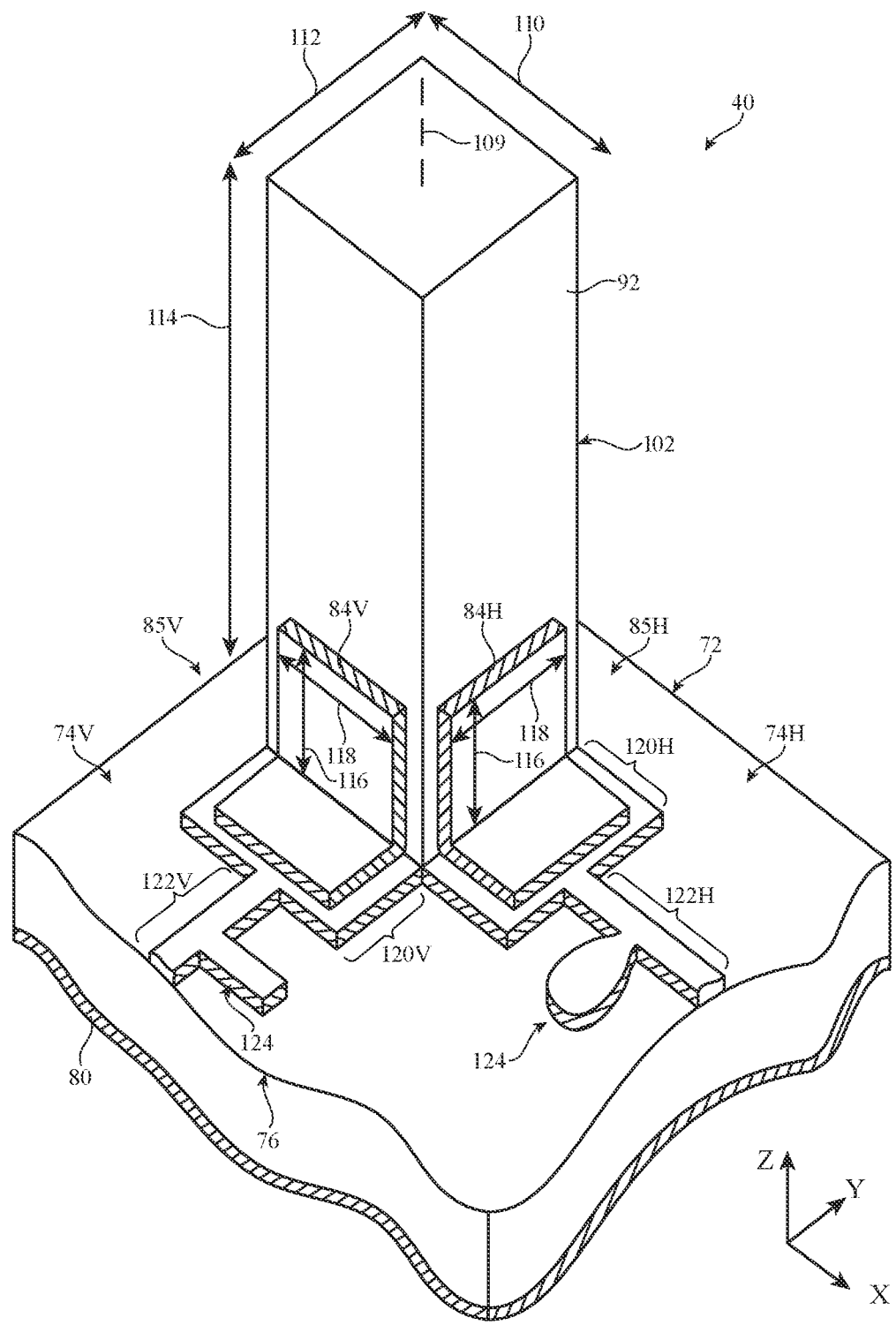
FIG. 7 is a perspective view of an illustrative probe-fed dielectric resonator antenna for covering multiple polarizations in accordance with some embodiments.

FIG. 7 is a perspective view of the probe-fed dielectric resonator antenna of FIG. 6 in a scenario where the dielectric resonating element is fed using multiple feed probes for covering multiple polarizations. Peripheral conductive housing structures 12W, dielectric substrate 90, dielectric matching layer 94, adhesive 96, rear housing wall 12R, display 14, and other components 58 of FIG. 6 are omitted from FIG. 7 for the sake of clarity.

As shown in FIG. 7, dielectric resonating element 92 of antenna 40 is mounted to top surface 76 of flexible printed circuit 72. Antenna 40 may be fed using multiple feed probes 85 such as a first feed probe 85V and a second feed probe 85H mounted to dielectric resonating element 92 and flexible printed circuit 72. Feed probe 85V includes conductive traces 84V patterned on a first sidewall 102 of dielectric resonating element 92. Feed probe 85H includes conductive traces 84H patterned on a second (orthogonal) sidewall 102 of dielectric resonating element 92.

Antenna 40 may be fed using multiple radio-frequency transmission lines 74 such as a first radio-frequency transmission line 74V and a second radio-frequency transmission line 74H. First radio-frequency transmission line 74V may include conductive traces 122V and 120V on top surface 76 of flexible printed circuit 72. Conductive traces 122V and 120V may form part of the signal conductor (e.g., signal traces 82 of FIG. 6) for radio-frequency transmission line 74V. Similarly, second radio-frequency transmission line 74H may include conductive traces 122H and 120H on top surface 76 of flexible printed circuit 72. Conductive traces 122H and 120H may form part of the signal conductor (e.g., signal traces 82 of FIG. 6) for radio-frequency transmission line 74H.

Conductive trace 122V may be narrower than conductive trace 120V. Conductive trace 122H may be narrower than conductive trace 120H. Conductive traces 120V and 120H may, for example, be conductive contact pads on top surface 76 of flexible printed circuit 72. Conductive traces 84V of feed probe 85V may be mounted and coupled to conductive trace 120V (e.g., using conductive interconnect structures 86 of FIG. 6). Similarly, conductive traces 84H of feed probe 85H may be mounted and coupled to conductive trace 120H.

Radio-frequency transmission line 74V and feed probe 85V may convey first radio-frequency signals having a first linear polarization (e.g., a vertical polarization). When driven using the first radio-frequency signals, feed probe 85V may excite one or more electromagnetic modes of dielectric resonating element 92 associated with the first polarization. When excited in this way, wave fronts associated with the first radio-frequency signals may propagate along the length of dielectric resonating element 92 (e.g., along central/longitudinal axis 109) and may be radiated through the display (e.g., through display cover layer 56 of FIG. 6).

Similarly, radio-frequency transmission line 74H and feed probe 85H may convey radio-frequency signals of a second linear polarization orthogonal to the first polarization (e.g., a horizontal polarization). When driven using the second radio-frequency signals, feed probe 85H may excite one or more electromagnetic modes of dielectric resonating element 92 associated with the second polarization. When excited in this way, wave fronts associated with the second radio-frequency signals may propagate along the length of dielectric resonating element 92 and may be radiated through the display (e.g., through display cover layer 56 of FIG. 6). Both feed probes 85H and 85V may be active at once so that antenna 40 conveys both the first and second radio-frequency signals at any given time. In another suitable arrangement, a single one of feed probes 85H and 85V may be active at once so that antenna 40 conveys radio-frequency signals of only a single polarization at any given time.

Dielectric resonating element 92 may have a length 110, width 112, and height 114. Length 110, width 112, and height 114 may be selected to provide dielectric resonating element 92 with a corresponding mix of electromagnetic cavity/waveguide modes that, when excited by feed probes 85H and/or 85V, configure antenna 40 to radiate at desired frequencies. For example, height 114 may be 2-10 mm, 4-6 mm, 3-7 mm, 4.5-5.5 mm, or greater than 2 mm. Width 112 and length 110 may each be 0.5-1.0 mm, 0.4-1.2 mm, 0.7-0.9 mm, 0.5-2.0 mm, 1.5 mm-2.5 mm, 1.7 mm-1.9 mm, 1.0 mm-3.0 mm, etc. Width 112 may be equal to length 110 or, in other arrangements, may be different than length 110. Sidewalls 102 of dielectric resonating element 92 may contact the surrounding dielectric substrate (e.g., dielectric substrate 90 of FIG. 6). The dielectric substrate may be molded over feed probes 85H and 85V or may include openings, notches, or other structures that accommodate the presence of feed probes 85H and 85V. The example of FIG. 7 is merely illustrative and, if desired, dielectric resonating element 92 may have other shapes (e.g., shapes with any desired number of straight and/or curved sidewalls 102).

Conductive traces 84V and 84H may each have width 118 and height 116. Width 118 and height 116 may be selected to match the impedance of radio-frequency transmission lines 74V and 74H to the impedance of dielectric resonating element 92. As an example, width 118 may be between 0.3 mm and 0.7 mm, between 0.2 mm and 0.8 mm, between 0.4 mm and 0.6 mm, or other values. Height 116 may be between 0.3 mm and 0.7 mm, between 0.2 mm and 0.8 mm, between 0.4 mm and 0.6 mm, or other values. Height 116 may be equal to width 118 or may be different than width 118.

If desired, transmission lines 74V and 74H may include one or more transmission line matching stubs such as matching stubs 124 coupled to traces 122V and 122H.

Matching stubs 124 may help to ensure that the impedance of radio-frequency transmission lines 74H and 74V are matched to the impedance of dielectric resonating element 92. Matching stubs 124 may have any desired shape or may be omitted. Conductive traces 84V and 84H may have other shapes (e.g., shapes having any desired number of straight and/or curved edges).

Figure 8:
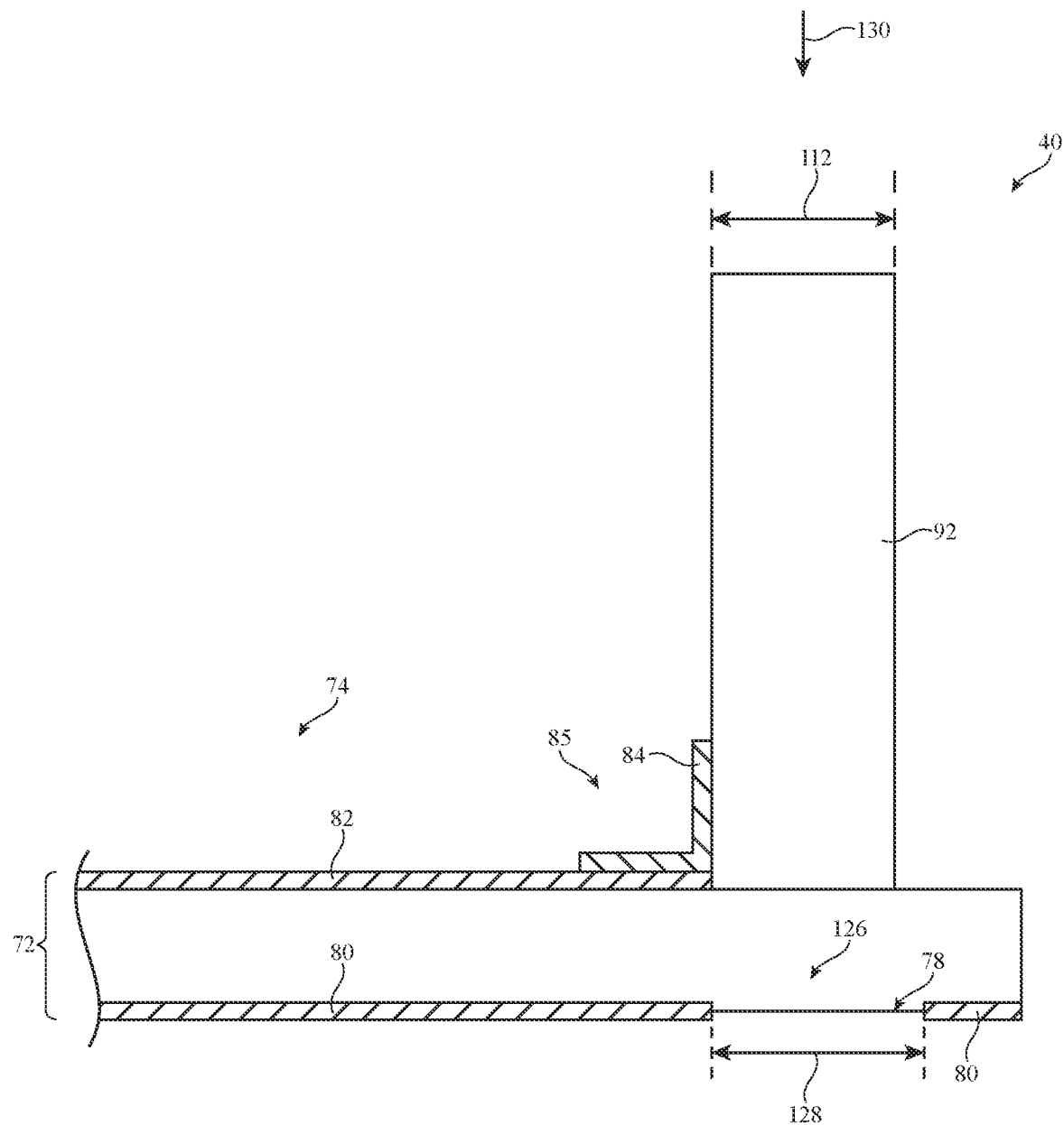
FIG. 8 is a cross-sectional side view of an illustrative probe-fed dielectric resonator antenna that overlaps an opening in ground traces in accordance with some embodiments.

If desired, a slot may be formed in ground traces 80 on flexible printed circuit 72 to help match the impedance of the radio-frequency transmission line(s) to dielectric resonating element 92. FIG. 8 is a cross-sectional side view of antenna 40 showing how ground traces 80 may include an opening to help match the impedance of the radio-frequency transmission line(s) to dielectric resonating element 92. In the example of FIG. 8, only a single feed probe is shown and peripheral conductive housing structures 12W, dielectric substrate 90, dielectric matching layer 94, adhesive 96, rear housing wall 12R, display 14, and other components 58 of FIG. 6 are omitted for the sake of clarity.

As shown in FIG. 8, ground traces 80 may include a slot or opening such as slot 126 at bottom surface 78 of flexible printed circuit 72. Dielectric resonating element 92 of antenna 40 may be mounted to flexible printed circuit 72 and may be aligned with the underlying slot 126. Slot 126 may have a width 128. Width 128 may, for example, be greater than or equal to width 112 of dielectric resonating element 92 (e.g., an entirety of the lateral area of dielectric resonating element 92 may overlap slot 126). Slot 126 may help to match the impedance of transmission line 74 to the impedance of dielectric resonating element 92. If desired, the presence of slot 126 may also allow feed probe 85 to excite additional electromagnetic modes of dielectric resonating element 92 to expand the frequencies and/or bandwidth covered by antenna 40. Width 128 may be adjusted to optimize impedance matching between radio-frequency transmission line 74 and dielectric resonating element 92 and/or to tune the frequency response (e.g., peak response frequency and bandwidth) of antenna 40. In addition, slot 126 may serve to minimize coupling between two linear polarizations (e.g., horizontal and vertical polarizations) in dielectric resonating element 92. For example, slot 126 may help to disturb ground current flow between the transceiver ports associated with transmission lines 74V and 74H (FIG. 7).

Figure 9:
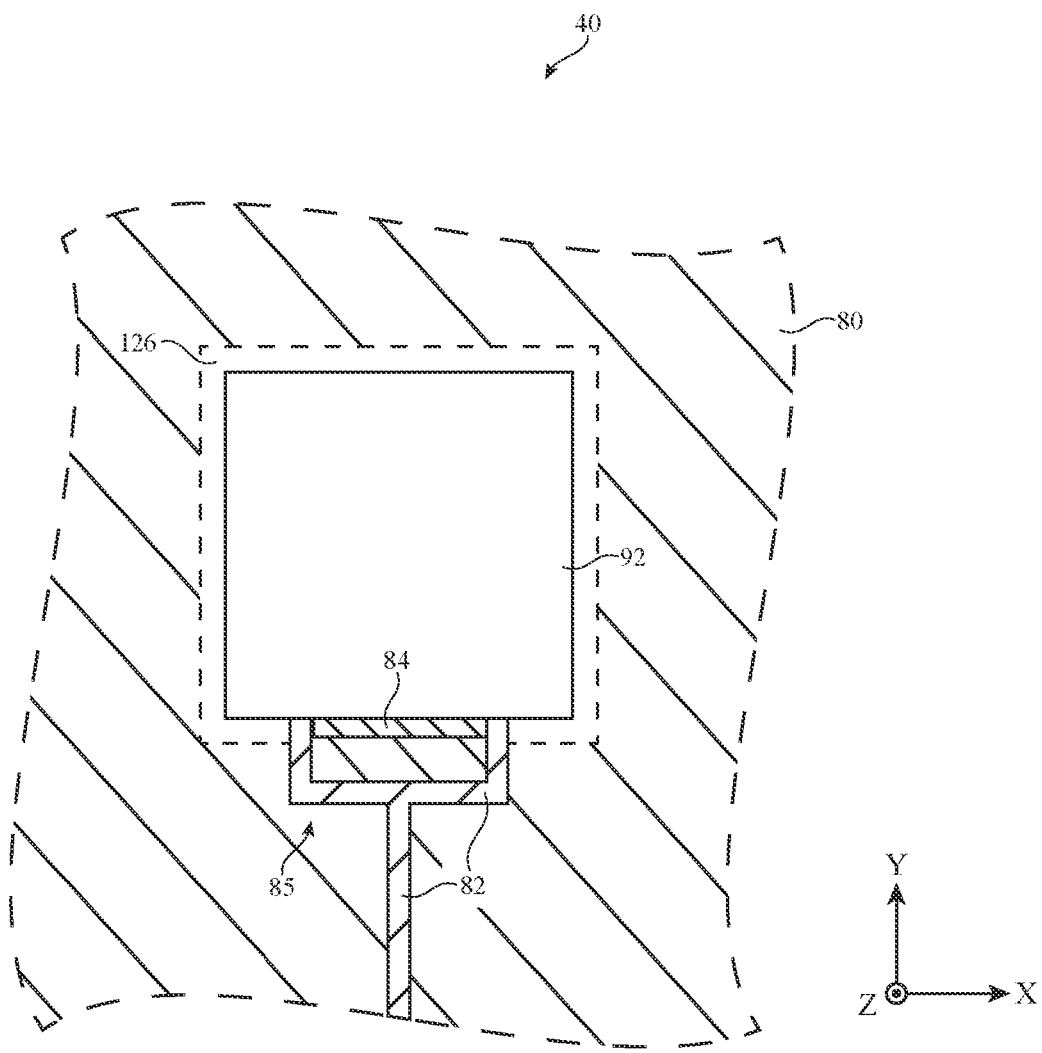
FIG. 9 is a top-down view of an illustrative probe-fed dielectric resonator antenna that overlaps an opening in ground traces in accordance with some embodiments.

FIG. 9 is a top-down view of antenna 40 showing how dielectric resonating element 92 may overlap an underlying slot 126 in ground traces 80 (e.g., as taken in the direction of arrow 130 of FIG. 8). In the example of FIG. 9, the dielectric material in flexible printed circuit 72 of FIG. 8 has been omitted for the sake of clarity.

As shown in FIG. 9, dielectric resonating element 92 may be aligned with slot 126 in the underlying ground traces 80. Slot 126 may have a rectangular shape (e.g., the same shape as the lateral shape of dielectric resonating element 92) or may have other shapes. Signal traces 82 may be coupled to conductive traces 84 in a corresponding feed probe 85 located on a given sidewall of dielectric resonating element 92. This example is merely illustrative and, if desired, additional feed probes and radio-frequency transmission lines may be provided to cover additional polarizations.

If desired, a given phased antenna array in device 10 may include different antennas that cover different polarizations (e.g., to provide the phased antenna array with polarization diversity). For example, a given phased antenna array may include a first set of antennas that cover a horizontal polarization and a second set of antennas that cover a vertical polarization. In order to optimize space consumption within the device, the first set of antennas may be interleaved among the second set of antennas in the phased antenna array.

Figure 10:
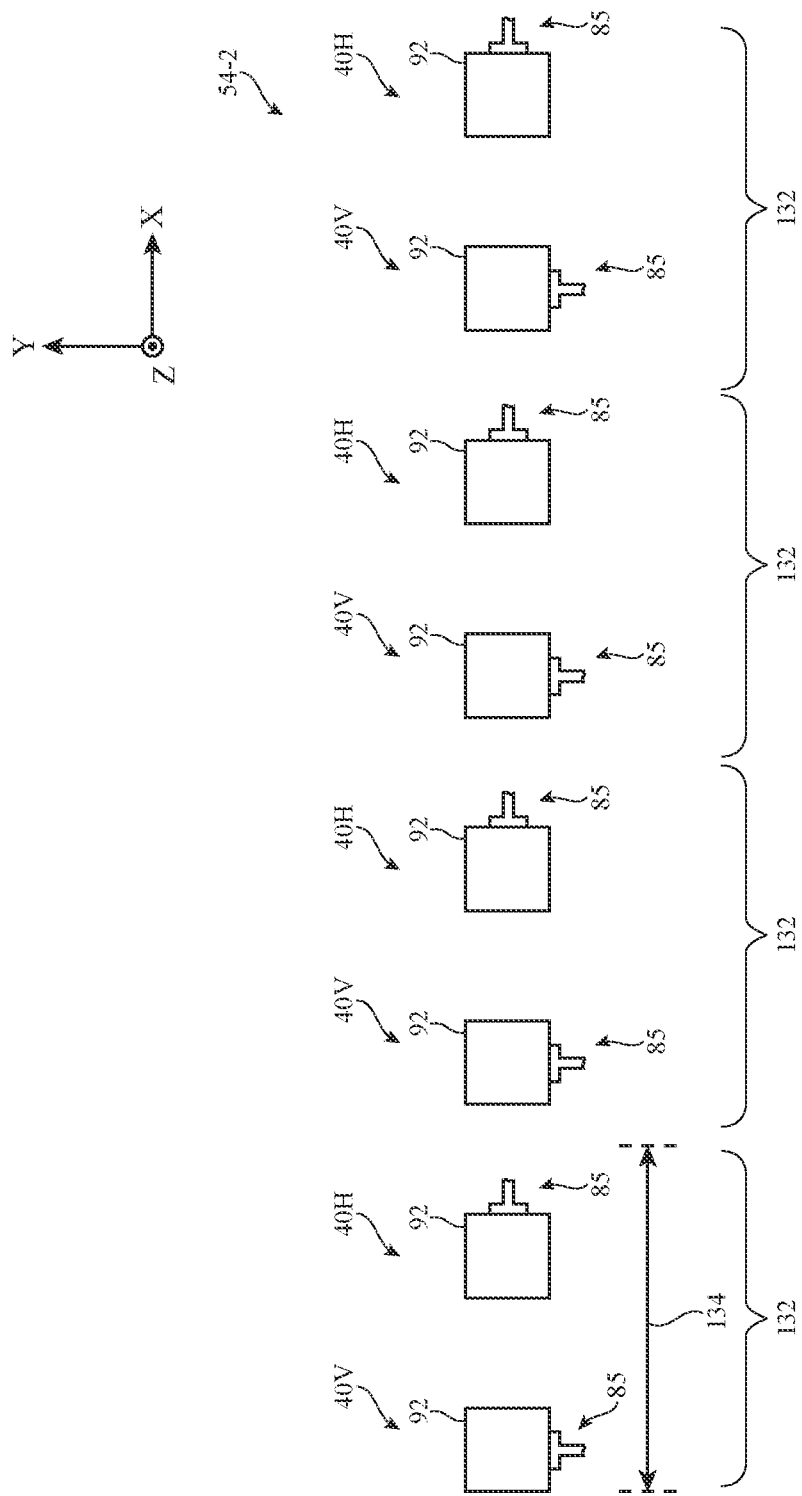
FIG. 10 is a top-down view of an illustrative phased antenna array having interleaved probe-fed dielectric resonator antennas for handling the same frequencies and different polarizations in accordance with some embodiments.

FIG. 10 is a top-down view of a given phased antenna array 54-2 having interleaved antennas for covering both horizontal and vertical polarizations. As shown in FIG. 10, phased antenna array 54-2 may include a first set of antennas 40V that convey radio-frequency signals with a first linear polarization (e.g., a vertical polarization) and a second set of antennas 40H that convey radio-frequency signals with an orthogonal second linear polarization (e.g., a horizontal polarization).

Antennas 40H and 40V may each include a dielectric resonating element 92 that is excited by a corresponding feed probe 85. Each dielectric resonating element 92 in phased antenna array 54-2 may be mounted within the same dielectric substrate (e.g., dielectric substrate 90 of FIG. 6) or may be mounted within two or more dielectric substrates. The feed probes 85 for antennas 40H may be oriented perpendicular to the feed probes 85 for antennas 40V. This example is merely illustrative. In another suitable arrangement, each antenna 40H and each antenna 40V may include two feed probes (e.g., feed probes 85H and 85V of FIG. 7). In this scenario, antennas 40H may convey radio-frequency signals over feed probes 85H of FIG. 7 whereas antennas 40V may convey radio-frequency signals over feed probes 85V. Antennas 40H and 40V may include underlying slots 126 in ground traces 80 (e.g., as shown in FIGS. 8 and 9) or may include continuous ground traces 80 under dielectric resonating elements 92 (e.g., as shown in FIGS. 6 and 7).

As shown in FIG. 10, phased antenna array 54-2 may include a repeating pattern of two or more unit cells 132 of antennas (sometimes referred to herein as antenna unit cells 132). Each unit cell 132 may include a corresponding antenna 40V and a corresponding antenna 40H. In the example of FIG. 10, phased antenna array 54-2 has four unit cells 132. This is merely illustrative and, if desired, phased antenna array 54-2 may have more than four unit cells 132 or fewer than four unit cells 132.

In order to allow for satisfactory beam forming, each antenna 40H in phased antenna array 54-2 may be located at approximately one-half of the effective wavelength of operation of antenna 40H from each adjacent antenna 40H in phased antenna array 54-2. Similarly, each antenna 40V may be located at approximately one-half of the effective wavelength of operation of antenna 40V from each adjacent antenna 40V. As shown in FIG. 10, each antenna 40V is separated from one or two adjacent antennas 40V in phased antenna array 54-2 by distance 134. Similarly, each antenna 40H is separated from one or two adjacent antennas 40H by distance 134 (e.g., unit cell 132 may have a width equal to distance 134). Distance 134 may be between 4 mm and 6 mm, between 3 mm and 7 mm, between 3.5 mm and 4.5 mm, approximately 4 mm, etc. Each antenna 40V may be located within the space between adjacent antennas 40H and each antenna 40H may be located in the space between adjacent antennas 40V in phased antenna array 54-2. In general, dielectric resonator antennas such as antennas 40H and 40L may occupy less lateral area than other types of antennas such as slot antennas or patch antennas. By forming antennas 40H and 40L as dielectric resonator antennas, there may be sufficient space between adjacent antennas 40H and between adjacent antennas 40L to allow the antennas 40V to be interleaved among the antennas 40H in phased antenna array 54-2. When arranged in this way, phased antenna array 54-2 may be provided with polarization diversity in as small an area as possible while still allowing for satisfactory beam forming for each polarization.

Figure 11:
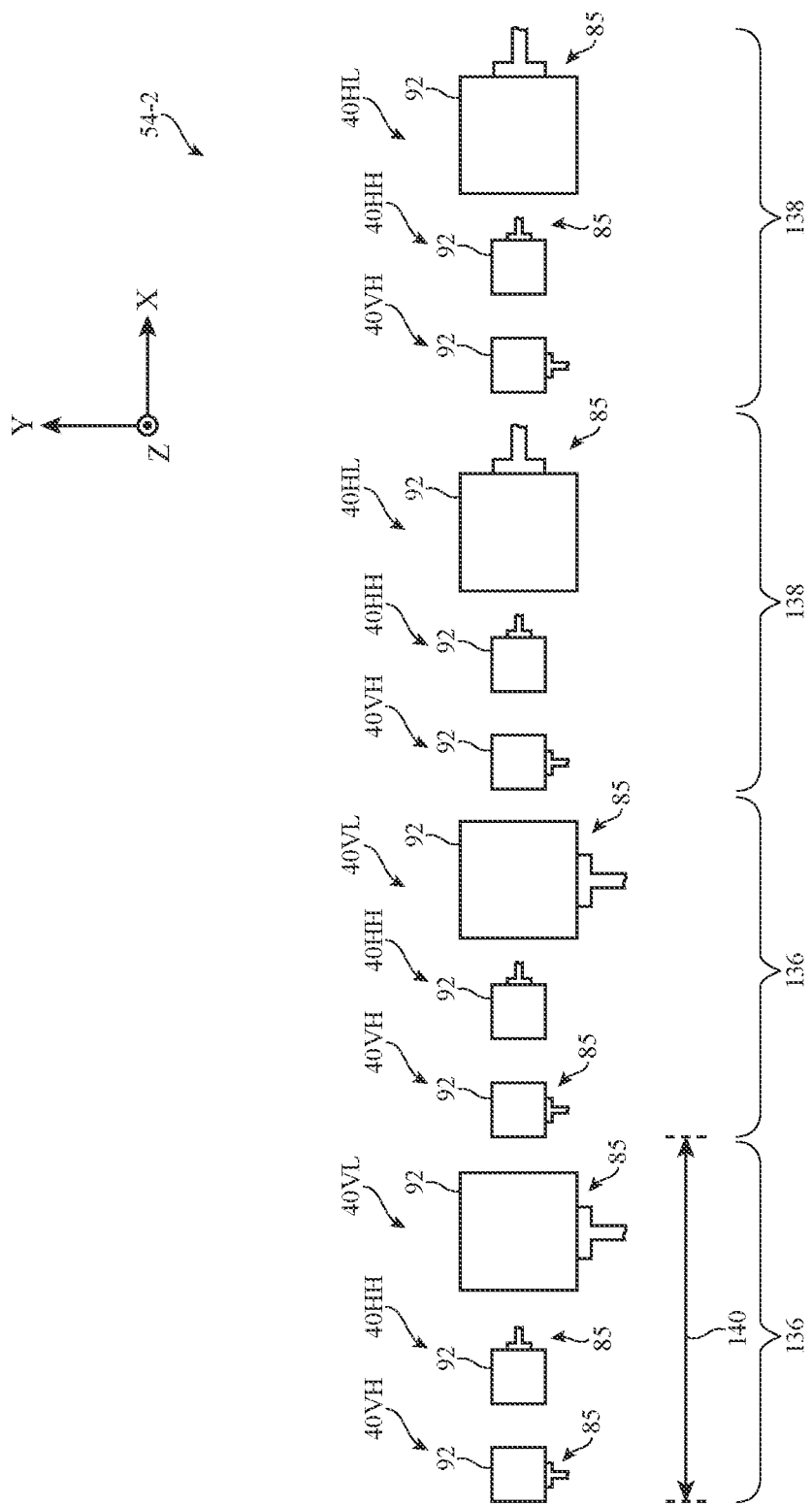
FIG. 11 is a top-down view of an illustrative phased antenna array having interleaved probe-fed dielectric resonator antennas for handling different frequencies and polarizations in accordance with some embodiments.

In the example of FIG. 10, each antenna in phased antenna array 54-2 covers the same frequency band(s). If desired, phased antenna array 54-2 may include different antennas that cover different frequency bands and/or different polarizations. FIG. 11 is a top-down view of a given phased antenna array 54-2 having different antennas for covering different frequency bands using both horizontal and vertical polarizations.

As shown in FIG. 11, phased antenna array 54-2 may include a first set of antennas 40VH, a second set of antennas 40HH, a third set of antennas 40VL, and a fourth set of antennas 40HL. Antennas 40VH and antennas 40HH may each convey radio-frequency signals in the same relatively high frequency band. Antennas 40VL and antennas 40HL may each convey radio-frequency signals in the same relatively low frequency band. The dimensions of dielectric resonating element 92 (and optionally the dimensions of the underlying slot 126 as shown in FIGS. 8 and 9) in antennas 40VL and 40HL may be larger than the dimensions of dielectric resonating element 92 in antennas 40VH and 40HH in order to support lower frequencies. The relatively low frequency band may, for example, include frequencies between 24 GHz and 31 GHz (e.g., a 28 GHz band), frequencies between 26 GHz and 30 GHz, or any other desired frequencies that are lower than the relatively high frequency band frequency band. The relatively high frequency band may, for example, include frequencies between 37 GHz and 41 GHz (e.g., a 39 GHz band), frequencies between 38 GHz and 40 GHz, or any other desired frequencies that are higher than the relatively low frequency band.

Antennas 40VH and 40VL may both convey radio-frequency signals with a first linear polarization (e.g., a vertical polarization). Antennas 40HH and 40HL may both convey radio-frequency signals with an orthogonal second polarization (e.g., a horizontal polarization). Phased antenna array 54-2 of FIG. 11 may include a repeating pattern of one or more unit cells 136 and one or more unit cells 138 of antennas (sometimes referred to herein as antenna unit cells 136 and 138). Each unit cell 136 may include a corresponding antenna 40VH, antenna 40HH, and antenna 40VL. Each unit cell 138 may include a corresponding antenna 40VH, antenna 40HH, and antenna 40HL. In the example of FIG. 11, phased antenna array 54-2 has two unit cells 136 and two unit cells 138. This is merely illustrative and, if desired, phased antenna array 54-2 may have any desired number of two or more unit cells 136 and two or more unit cells 138.

In order to allow for satisfactory beam forming, each antenna 40VH in phased antenna array 54-2 may be located at approximately one-half of the effective wavelength corresponding to a frequency in the relatively high frequency band from one or more adjacent antennas 40VH in phased antenna array 54-2. Similarly, each antenna 40HH may be located at approximately one-half of the effective wavelength corresponding to the frequency in the relatively high frequency band from one or more adjacent antennas 40HH in phased antenna array 54-2. At the same time, each antenna 40VL in phased antenna array 54-2 may be located at approximately one-half of the effective wavelength corresponding to a frequency in the relatively low frequency band from one or more adjacent antennas 40VL in phased antenna array 54-2. Similarly, each antenna 40HL may be located at approximately one-half of the effective wavelength corresponding to the frequency in the relatively low frequency band from one or more adjacent antennas 40HL in phased antenna array 54-2.

As shown in FIG. 11, each antenna 40VH is separated from one or two adjacent antennas 40VH by distance 140, each antenna 40HH is separated from one or two adjacent antennas 40HH by distance 140, each antenna 40VL is separated from one or two adjacent antennas 40VL by distance 140, and each antenna 40HL is separated from one or two adjacent antennas 40HL by distance 140 (e.g., unit cells 136 and 138 may each have a width equal to distance 140). Distance 140 may, for example, be approximately equal to one-half of the wavelength of operation of antennas 40VH and 40HH (e.g., the effective wavelength corresponding to a frequency in the relatively high frequency band of phased antenna array 54-2). As some examples, distance 140 may be between 4 mm and 6 mm, between 4.5 mm and 5.5 mm, between 3 mm and 7 mm, between 3 mm and 5 mm, approximately 4 mm, etc. By forming antennas 40VH, 40HH, 40VL, and 40HL as dielectric resonator antennas (rather than as patch or slot antennas), there may be sufficient space to form both an antenna 40HH and one of antennas 40VL or 40HL between each pair of adjacent antennas 40VH. By interleaving the antennas in this way, phased antenna array 54-2 may be provided with polarization diversity for both the relatively low and relatively high frequency bands while occupying as small an area as possible in device 10.

Figure 12:
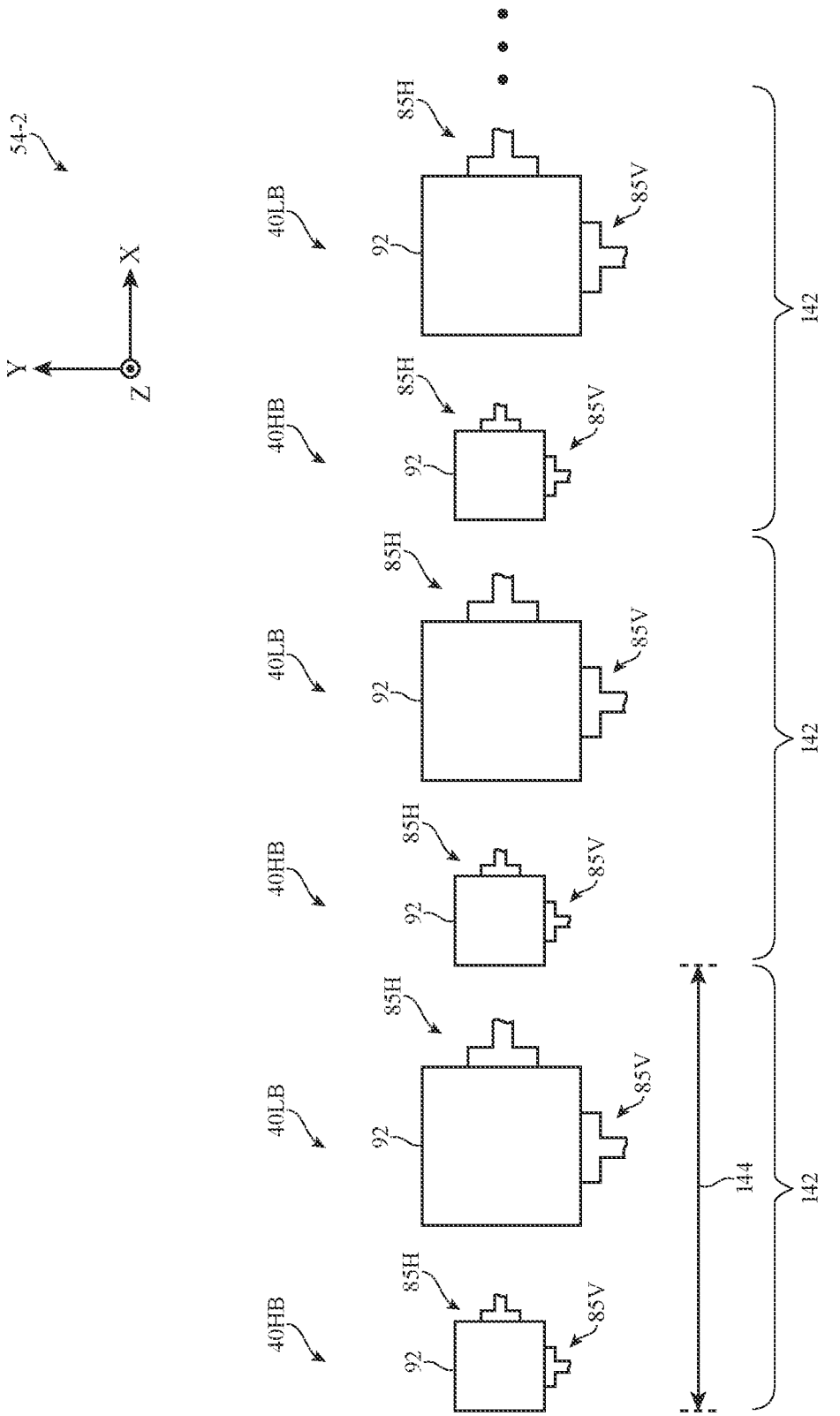
FIG. 12 is a top-down view of an illustrative phased antenna array having interleaved, dual-polarization, probe-fed dielectric resonator antennas for handling different frequencies in accordance with some embodiments.

In another suitable arrangement, each antenna in phased antenna array 54-2 may simultaneously cover both linear polarizations. FIG. 12 is a top-down view of a given phased antenna array 54-2 having different antennas for covering different frequency bands using both horizontal and vertical polarizations.

As shown in FIG. 12, phased antenna array 54-2 may include a first set of antennas 40HB and a second set of antennas 40LB. Each antenna 40HB may include a first feed probe 85V and a second feed probe 85H orthogonal to the first feed probe. Similarly, each antenna 40LB may include a first feed probe 85V and a second feed probe 85H orthogonal to the first feed probe. Antennas 40HB may each convey radio-frequency signals in the relatively high frequency band (e.g., a frequency band at 39 GHz) with both horizontal and vertical polarizations. Antennas 40LB may each convey radio-frequency signals in the relatively low frequency band (e.g., a frequency band at 28 GHz) with both horizontal and vertical polarizations. The dimensions of dielectric resonating element 92 (and optionally the dimensions of the underlying slot 126 as shown in FIGS. 8 and 9) in antennas 40LB may be larger than the dimensions of dielectric resonating element 92 in antennas 40HB in order to support lower frequencies. If desired, control circuitry (e.g., control circuitry 28 of FIG. 2) may selectively activate only one of feed probes 85V and 85H in antennas 40HB and/or antennas 40LB at any given time so that the antennas only convey a single polarization.

Phased antenna array 54-2 of FIG. 12 may include a repeating pattern of two or more unit cells 142 (sometimes referred to herein as antenna unit cells 142). Each unit cell 142 may include a corresponding antenna 40HB and a corresponding antenna 40LB. In the example of FIG. 12, phased antenna array 54-2 has four unit cells 142. This is merely illustrative and, if desired, phased antenna array 54-2 may have any desired number of two or more unit cells 142.

In order to allow for satisfactory beam forming, each antenna 40LB in phased antenna array 54-2 may be located at approximately one-half of the effective wavelength corresponding to a frequency in the relatively low frequency band from one or more adjacent antennas 40LB in phased antenna array 54-2. Similarly, each antenna 40HB may be located at approximately one-half of the effective wavelength corresponding to the frequency in the relatively high frequency band from one or more adjacent antennas 40HB in phased antenna array 54-2. As shown in FIG. 12, each antenna 40HB is separated from one or two adjacent antennas 40HB by distance 144 and each antenna 40LB is separated from one or two adjacent antennas 40LB by distance 144 (e.g., unit cells 142 may each have a width equal to distance 144). Distance 144 may, for example, be approximately equal to one-half of the wavelength of operation of antennas 40HB (e.g., the effective wavelength corresponding to a frequency in the relatively high frequency band of phased antenna array 54-2). As some examples, distance 144 may be between 4 mm and 6 mm, between 4.5 mm and 5.5 mm, between 3 mm and 7 mm, between 3 mm and 5 mm, approximately 4 mm, etc. By forming antennas 40HB and 40LB as dielectric resonator antennas (rather than as patch or slot antennas), there may be sufficient space to form an antenna 40LB between each pair of antennas 40HB in phased antenna array 54-2. By interleaving the antennas in this way, phased antenna array 54-2 may cover orthogonal polarizations in both the relatively low and relatively high frequency bands while occupying as small an area as possible in device 10.

The examples of FIGS. 10-12 are merely illustrative. If desired, phased antenna array 54-2 may include antennas arranged in a two-dimensional pattern. When arranged in this way, similar spacing may be provided between antennas of the same polarization and frequency band in the vertical direction as in the horizontal direction shown in FIGS. 10-12. For example, adjacent rows of antennas in the phased antenna array may be staggered with respect to each other (e.g., to ensure that vertically-adjacent antennas do not cover the same frequency band and polarization).

Figure 13:
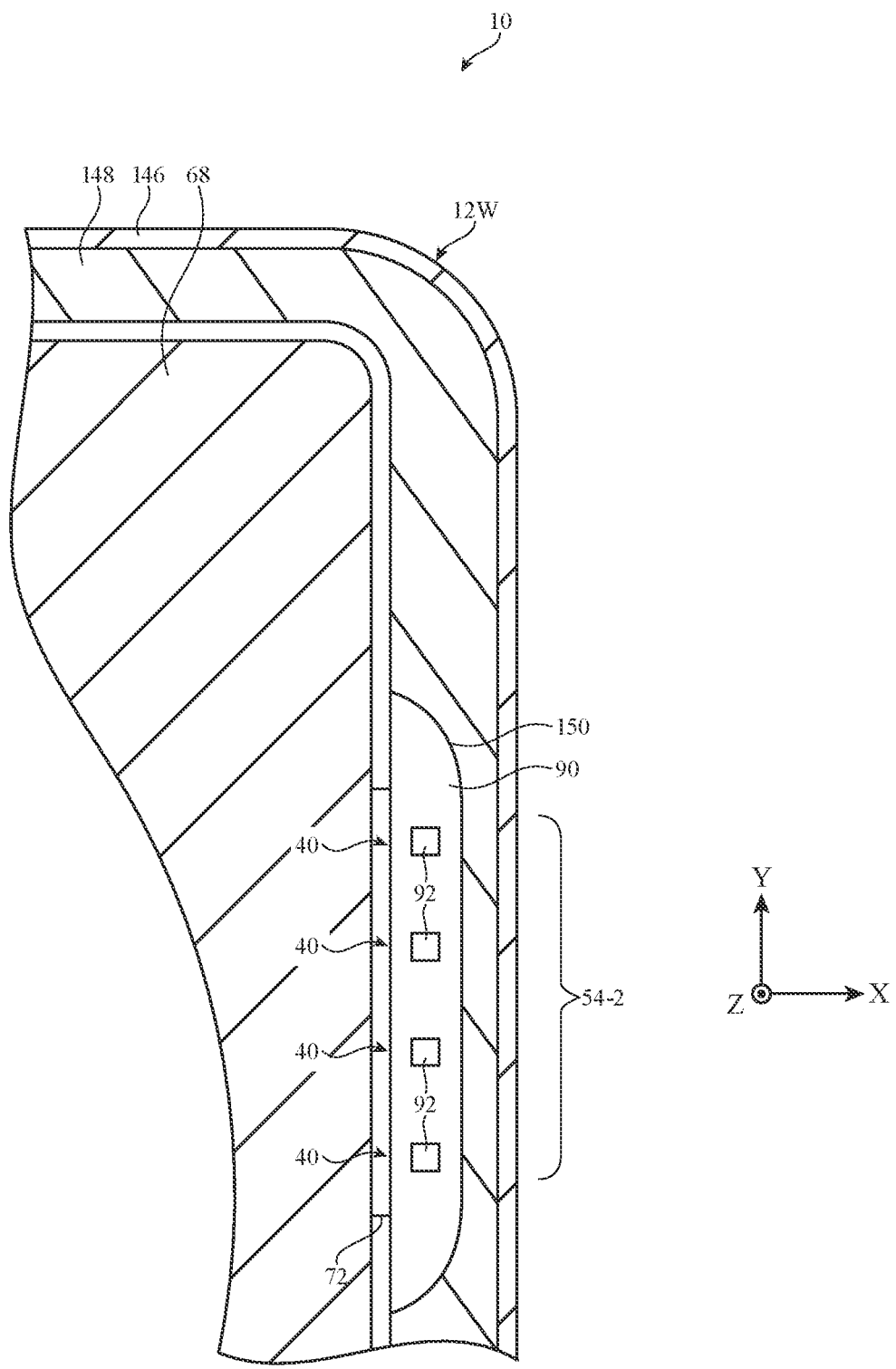
FIG. 13 is a top-down view of an illustrative electronic device having probe-fed dielectric resonator antennas aligned with a notch in peripheral conductive housing structures in accordance with some embodiments.

One or more phased antenna arrays 54-2 may be mounted at any desired locations in device 10 along the periphery of display 14 for radiating through the display (e.g., within inactive area IA of display 14 of FIG. 1). FIG. 13 is a top-down view of device 10 showing how a given phased antenna array 54-2 may be aligned with a notch in peripheral conductive housing structures 12W.

As shown in FIG. 13, peripheral conductive housing structures 12W may run around the periphery of display module 68 in device 10. Display cover layer 56 of FIGS. 5 and 6 has been omitted from FIG. 13 for the sake of clarity. Peripheral conductive housing structures 12W may include an inwardly protruding lip 148 (sometimes referred to herein as a ledge or datum) and a raised portion 146. Raised portion 146 may run around the peripheral edge of the display cover layer. Lip 148 of peripheral conductive housing structures 12W may include an opening such as notch 150. Phased antenna array 54-2 (e.g., a phased antenna array that covers a single polarization and frequency band, a phased antenna array that covers multiple polarizations in the same frequency band(s) as shown in FIG. 10, or a phased antenna array that covers multiple polarizations and multiple frequency bands as shown in FIGS. 11 and 12) may be mounted below lip 148 and aligned with notch 150.

The antennas 40 in phased antenna array 54-2 may each include a dielectric resonating element 92 surrounded by one or more dielectric substrates 90. Each antenna 40 in phased antenna array 54-2 may be fed using a corresponding radio-frequency transmission line in the same flexible printed circuit 72. This example is merely illustrative and, if desired, two or more antennas 40 in phased antenna array 54-2 may be fed using radio-frequency transmission lines in separate flexible printed circuits. The antennas 40 in phased antenna array 54-2 may convey radio-frequency signals through notch 150 and the display cover layer (not shown). Phased antenna array 54-2 may perform beam steering within the hemisphere above the front face of device 10. The example of FIG. 13 is merely illustrative. If desired, the antennas 40 in phased antenna array 54-2 may be arranged in a two-dimensional pattern having multiple rows and columns of antennas or in may be arranged in other patterns.

Figure 14:
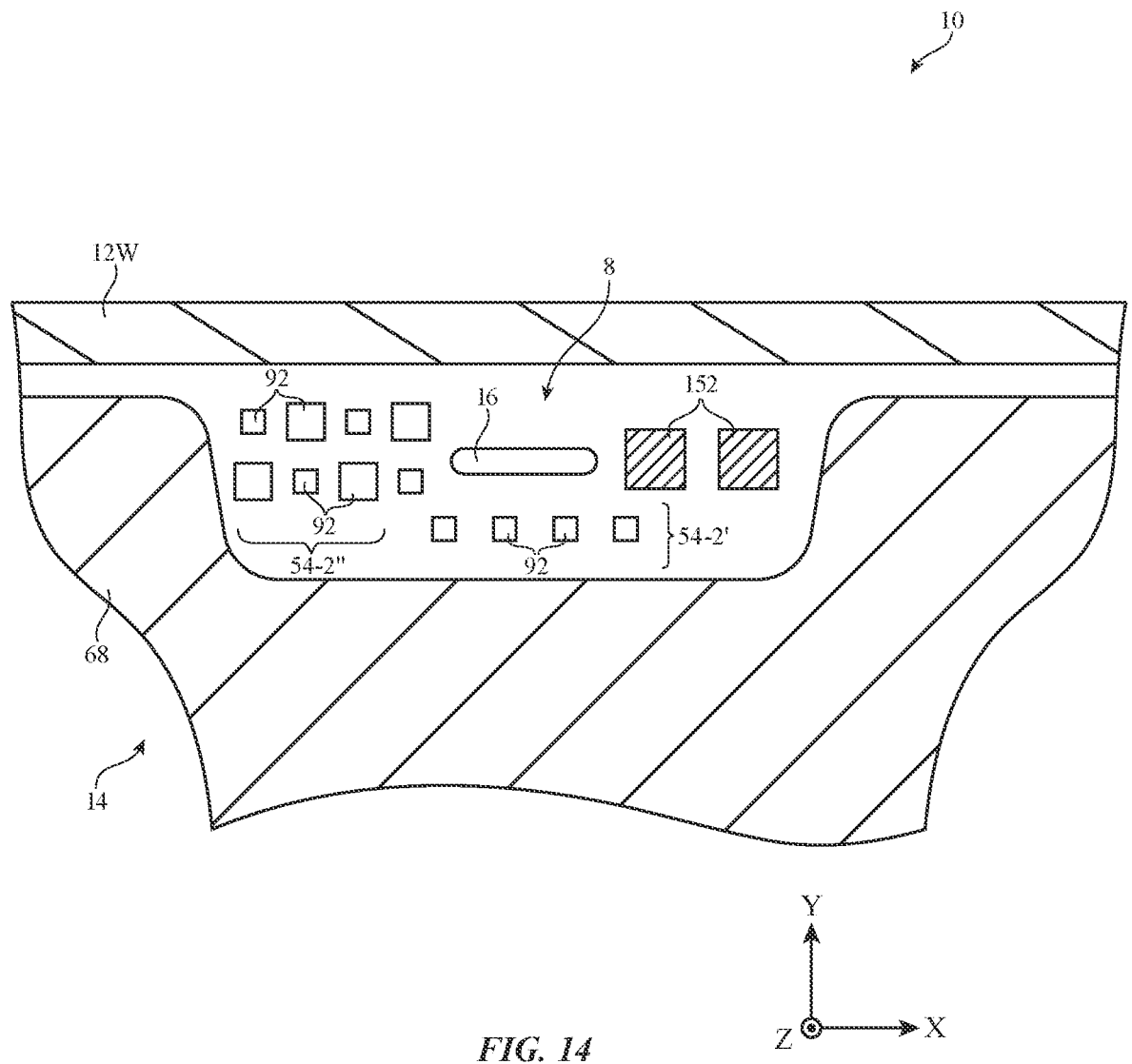
FIG. 14 is a top-down view of an illustrative electronic device having probe-fed dielectric resonator antennas aligned with a notch in a display module in accordance with some embodiments.

If desired, phased antenna array 54-2 may be located elsewhere within device 10. In one suitable arrangement, phased antenna array 54-2 may be located within notch 8 in active area AA of display 14 (FIG. 1). FIG. 14 is a top-down view showing how phased antenna array 54-2 may be aligned with notch 8 in active area AA of display 14.

As shown in FIG. 14, display module 68 of display 14 may include notch 8. Display cover layer 56 of FIGS. 5 and 6 has been omitted from FIG. 14 for the sake of clarity. Display module 68 may form active area AA of display 14 whereas notch 8 forms part of inactive area IA of display 14 (FIG. 1). The edges of notch 8 may be defined by peripheral conductive housing structures 12W and display module 68. For example, notch 8 may have two or more edges (e.g., three edges) defined by display module 68 and one or more edges defined by peripheral conductive housing structures 12W.

Device 10 may include speaker port 16 (e.g., an ear speaker) within notch 8. If desired, device 10 may include other components 152 within notch 10. Other components 152 may include one or more image sensors such as one or more cameras, an infrared image sensor, an infrared light emitter (e.g., an infrared dot projector and/or flood illuminator), an ambient light sensor, a fingerprint sensor, a capacitive proximity sensor, a thermal sensor, a moisture sensor, or any other desired input/output components (e.g., input/output devices 26 of FIG. 2). One or more phased antenna arrays 54-2 may be aligned with the portion(s) of notch 8 that are not occupied by other components 152 or speaker port 16. Phased antenna arrays 54-2 that are aligned with notch 8 may include one-dimensional phased antenna arrays such as one-dimensional phased antenna array 54-2' and/or two-dimensional phased antenna arrays such as two-dimensional phased antenna array 54-2". Because dielectric resonating elements 92 occupy less lateral area than patch antennas or slot antennas that cover the same frequencies, phased antenna arrays 54-2' and 54-2" may fit within notch 8 and may still exhibit satisfactory antenna efficiency despite the presence of speaker port 16 and other components 152.

If desired, multiple phased antenna arrays 54-2 may be aligned with multiple notches in peripheral conductive housing structures 12W (e.g., multiple notches 150 of FIG. 13) and/or may be aligned with notch 8 in display module 68. Phased antenna arrays 54-2 may provide beam steering in one or more frequency bands between 10 GHz and 300 GHz within some or all of the hemisphere over the front face of device 10. When combined with the operation of phased antenna array 54-1 at the rear of device 10 (FIG. 5), the phased antenna arrays in device 10 may collectively provide coverage within approximately a full sphere around device 10.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:
   a housing;
   a display having a display cover layer mounted to the housing; and
   a probe-fed dielectric resonator antenna in the housing and configured to convey radio-frequency signals at a frequency greater than 10 GHz through the display cover layer.

2. The electronic device defined in claim 1, wherein the probe-fed dielectric resonator antenna comprises:
   a dielectric resonating element; and
   a feed probe on the dielectric resonating element, wherein the feed probe is configured to excite the dielectric resonating element to radiate the radio-frequency signals.

3. The electronic device defined in claim 2, further comprising:
   a printed circuit, wherein the dielectric resonating element is mounted to the printed circuit; and
   a radio-frequency transmission line on the printed circuit and coupled to the feed probe.

4. The electronic device defined in claim 3, wherein the radio-frequency transmission line comprises a signal trace and the feed probe comprises a conductive trace that is patterned on the dielectric resonating element and coupled to the signal trace.

5. The electronic device defined in claim 4, wherein the conductive trace is configured to match an impedance of the radio-frequency transmission line to an impedance of the dielectric resonating element.

6. The electronic device defined in claim 4, wherein the signal trace comprises a matching stub configured to match an impedance of the radio-frequency transmission line to an impedance of the dielectric resonating element.

7. The electronic device defined in claim 4, wherein the feed probe is mounted to a first sidewall of the dielectric resonating element and the probe-fed dielectric resonator antenna further comprises:
   an additional feed probe mounted to a second sidewall of the dielectric resonating element, the second sidewall being orthogonal to the first sidewall, and the additional feed probe being configured to excite the dielectric resonating element to radiate the radio-frequency signals.

8. The electronic device defined in claim 4, further comprising:
   ground traces on the printed circuit, wherein the ground traces define a slot that overlaps the dielectric resonating element.

9. The electronic device defined in claim 2, further comprising:
   a dielectric matching layer interposed between the dielectric resonating element and the display cover layer, wherein the dielectric resonating element has a first dielectric constant, the display cover layer has a second dielectric constant that is greater than the first dielectric constant, and the dielectric matching layer has a third dielectric constant that is greater than the second dielectric constant and less than the first dielectric constant.

10. The electronic device defined in claim 2, wherein the dielectric resonating element comprises zirconia.

11. The electronic device defined in claim 2, wherein the feed probe comprises a conductive patch.

12. The electronic device defined in claim 1, further comprising:
   peripheral conductive housing structures that extend around a periphery of the electronic device, wherein the display cover layer is mounted to the peripheral conductive housing structures; and
   a notch in the peripheral conductive housing structures, wherein the probe-fed dielectric resonating element is aligned with the notch and configured to convey the radio-frequency signals through the notch.

13. The electronic device defined in claim 1, further comprising:
   peripheral conductive housing structures that extend around a periphery of the electronic device, wherein the display cover layer is mounted to the peripheral conductive housing structures;
   a display module configured to emit light through the display cover layer, wherein the display module comprises a notch, the notch having edges defined by the display module and the peripheral conductive housing structures;
   an audio speaker aligned with the notch; and
   an image sensor aligned with the notch, wherein the probe-fed dielectric resonator antenna is aligned with the notch and configured to convey the radio-frequency signals through the notch.

14. The electronic device defined in claim 1, further comprising:
   peripheral conductive housing structures that extend around a periphery of the electronic device, wherein the display cover layer is mounted to the peripheral conductive housing structures;
   a rear housing wall that opposes the display cover layer; and
   a phased antenna array configured to convey additional radio-frequency signals at an additional frequency greater than 10 GHz through the rear housing wall.

15. The electronic device defined in claim 1, wherein the probe-fed dielectric resonator antenna is part of a phased antenna array of probe-fed dielectric resonator antennas configured to radiate through the display cover layer.

16. The electronic device defined in claim 15, wherein the phased antenna array is a one-dimensional phased antenna array.

17. The electronic device defined in claim 16, further comprising:
   peripheral conductive housing structures that extend around a periphery of the electronic device, wherein the display cover layer is mounted to the peripheral conductive housing structures; and
   a notch in the peripheral conductive housing structures, wherein the phased antenna array is aligned with the notch and configured to radiate through the notch.

18. The electronic device defined in claim 17, wherein the phased antenna array comprises:
   a first additional probe-fed dielectric resonator antenna configured to convey radio-frequency signals at the frequency through the display cover layer;
   a second additional probe-fed dielectric resonator antenna configured to convey radio-frequency signals at an additional frequency through the display cover layer, the additional frequency being greater than 10 GHz and different from the frequency; and
   a third additional probe-fed dielectric resonator antenna configured to convey radio-frequency signals at the additional frequency through the display cover layer.

19. The electronic device of claim 18, wherein the second additional probe-fed dielectric resonator antenna is interposed between the probe-fed dielectric resonator antenna and the first additional probe-fed dielectric resonator antenna, the first additional probe-fed dielectric resonator antenna being interposed between the second and third additional probe-fed dielectric resonator antennas.

20. The electronic device of claim 18, wherein the probe-fed dielectric resonator antenna comprises a first dielectric resonating element embedded in a molded plastic substrate, the first additional probe-fed dielectric resonator antenna comprises a second dielectric resonating element embedded in the molded plastic substrate, the second additional probe-fed dielectric resonator antenna comprises a third dielectric resonating element embedded in the molded plastic substrate, and the third additional probe-fed dielectric resonator comprises a third dielectric resonating element embedded in the molded plastic substrate, the electronic device further comprising:
 a flexible printed circuit, wherein the molded plastic substrate and the first, second, third, and fourth dielectric resonating elements are mounted to a flexible printed circuit.

* * * * *